US012079723B2

(12) United States Patent
Sidhu et al.

(10) Patent No.: US 12,079,723 B2
(45) Date of Patent: *Sep. 3, 2024

(54) OPTIMIZING NEURAL NETWORK STRUCTURES FOR EMBEDDED SYSTEMS

(71) Applicant: Tesla, Inc., Austin, TX (US)

(72) Inventors: Harsimran Singh Sidhu, Fremont, CA (US); Paras Jagdish Jain, Cupertino, CA (US); Daniel Paden Tomasello, Los Altos Hills, CA (US); Forrest Nelson Iandola, San Jose, CA (US)

(73) Assignee: Tesla, Inc., Austin, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/183,515

(22) Filed: Mar. 14, 2023

(65) Prior Publication Data

US 2023/0289599 A1 Sep. 14, 2023

Related U.S. Application Data

(62) Division of application No. 16/522,411, filed on Jul. 25, 2019, now Pat. No. 11,636,333.

(Continued)

(51) Int. Cl.
*G06N 3/08* (2023.01)
*G05B 13/02* (2006.01)
(Continued)

(52) U.S. Cl.
CPC ............. *G06N 3/08* (2013.01); *G05B 13/027* (2013.01); *G05D 1/0088* (2013.01);
(Continued)

(58) Field of Classification Search
CPC ........ G06F 9/45533; G06N 3/08; G06N 3/10; G05B 13/027; G05D 1/0088; G05D 1/0214; G05D 1/0221
See application file for complete search history.

(56) References Cited

U.S. PATENT DOCUMENTS 6,882,755 B2   5/2005   Silverstein et al.
7,209,031 B2   4/2007   Nakai et al.
(Continued)

FOREIGN PATENT DOCUMENTS

AU   2019261735 A1   6/2020
AU   2019201716 A1   10/2020
(Continued)

*Primary Examiner* — Douglas M Slachta
(74) *Attorney, Agent, or Firm* — FOLEY & LARDNER LLP

(57) ABSTRACT

A model training and implementation pipeline trains models for individual embedded systems. The pipeline iterates through multiple models and estimates the performance of the models. During a model generation stage, the pipeline translates the description of the model together with the model parameters into an intermediate representation in a language that is compatible with a virtual machine. The intermediate representation is agnostic or independent to the configuration of the target platform. During a model performance estimation stage, the pipeline evaluates the performance of the models without training the models. Based on the analysis of the performance of the untrained models, a subset of models is selected. The selected models are then trained and the performance of the trained models are analyzed. Based on the analysis of the performance of the trained models, a single model is selected for deployment to the target platform.

8 Claims, 11 Drawing Sheets

Related U.S. Application Data

(60) Provisional application No. 62/703,837, filed on Jul. 26, 2018.

(51) Int. Cl.
  *G05D 1/00* (2024.01)
  *G06F 9/455* (2018.01)
  *G06N 3/10* (2006.01)

(52) U.S. Cl.
  CPC ......... *G05D 1/0214* (2013.01); *G05D 1/0221* (2013.01); *G06F 9/45533* (2013.01); *G06N 3/10* (2013.01)

(56) References Cited

U.S. PATENT DOCUMENTS

| | | | |
|---|---|---|---|
| 7,747,070 | B2 | 6/2010 | Puri |
| 7,904,867 | B2 | 3/2011 | Burch et al. |
| 7,974,492 | B2 | 7/2011 | Nishijima |
| 8,165,380 | B2 | 4/2012 | Choi et al. |
| 8,190,537 | B1 | 5/2012 | Singh |
| 8,369,633 | B2 | 2/2013 | Lu et al. |
| 8,406,515 | B2 | 3/2013 | Cheatle et al. |
| 8,509,478 | B2 | 8/2013 | Haas et al. |
| 8,588,470 | B2 | 11/2013 | Rodriguez et al. |
| 8,620,837 | B2 * | 12/2013 | Ghani ............... G06N 20/00 706/12 |
| 8,744,174 | B2 | 6/2014 | Hamada et al. |
| 8,773,498 | B2 | 7/2014 | Lindbergh |
| 8,912,476 | B2 | 12/2014 | Fogg et al. |
| 8,913,830 | B2 | 12/2014 | Sun et al. |
| 8,928,753 | B2 | 1/2015 | Han et al. |
| 8,972,095 | B2 | 3/2015 | Furuno et al. |
| 8,976,269 | B2 | 3/2015 | Duong |
| 9,008,422 | B2 | 4/2015 | Eid et al. |
| 9,081,385 | B1 | 7/2015 | Ferguson et al. |
| 9,275,289 | B2 | 3/2016 | Li et al. |
| 9,437,189 | B2 * | 9/2016 | Epstein ............... G10L 15/063 |
| 9,586,455 | B2 | 3/2017 | Sugai et al. |
| 9,672,437 | B2 | 6/2017 | McCarthy |
| 9,710,696 | B2 | 7/2017 | Wang et al. |
| 9,738,223 | B2 | 8/2017 | Zhang et al. |
| 9,754,154 | B2 | 9/2017 | Craig et al. |
| 9,767,369 | B2 | 9/2017 | Furman et al. |
| 9,965,865 | B1 | 5/2018 | Agrawal et al. |
| 10,133,273 | B2 | 11/2018 | Linke |
| 10,140,252 | B2 | 11/2018 | Fowers et al. |
| 10,140,544 | B1 | 11/2018 | Zhao et al. |
| 10,146,225 | B2 | 12/2018 | Ryan |
| 10,152,655 | B2 | 12/2018 | Krishnamurthy et al. |
| 10,167,800 | B1 | 1/2019 | Chung et al. |
| 10,169,680 | B1 | 1/2019 | Sachdeva et al. |
| 10,192,016 | B2 | 1/2019 | Ng et al. |
| 10,216,189 | B1 | 2/2019 | Haynes |
| 10,228,693 | B2 | 3/2019 | Micks et al. |
| 10,242,293 | B2 | 3/2019 | Shim et al. |
| 10,248,121 | B2 | 4/2019 | VandenBerg, III |
| 10,262,218 | B2 | 4/2019 | Lee et al. |
| 10,282,623 | B1 | 5/2019 | Ziyaee et al. |
| 10,296,828 | B2 | 5/2019 | Viswanathan |
| 10,303,961 | B1 | 5/2019 | Stoffel et al. |
| 10,310,087 | B2 | 6/2019 | Laddha et al. |
| 10,311,312 | B2 | 6/2019 | Yu et al. |
| 10,318,848 | B2 | 6/2019 | Dijkman et al. |
| 10,325,178 | B1 | 6/2019 | Tang et al. |
| 10,331,974 | B2 | 6/2019 | Zia et al. |
| 10,338,600 | B2 | 7/2019 | Yoon et al. |
| 10,343,607 | B2 | 7/2019 | Kumon et al. |
| 10,359,783 | B2 | 7/2019 | Williams et al. |
| 10,366,290 | B2 | 7/2019 | Wang et al. |
| 10,372,130 | B1 | 8/2019 | Kaushansky et al. |
| 10,373,019 | B2 | 8/2019 | Nariyambut Murali et al. |
| 10,373,026 | B1 | 8/2019 | Kim et al. |
| 10,380,741 | B2 | 8/2019 | Yedla et al. |
| 10,394,237 | B2 | 8/2019 | Xu et al. |
| 10,395,144 | B2 | 8/2019 | Zeng et al. |
| 10,402,646 | B2 | 9/2019 | Klaus |
| 10,402,986 | B2 | 9/2019 | Ray et al. |
| 10,414,395 | B1 | 9/2019 | Sapp et al. |
| 10,423,934 | B1 | 9/2019 | Zanghi et al. |
| 10,436,615 | B2 | 10/2019 | Agarwal et al. |
| 10,452,905 | B2 | 10/2019 | Segalovitz et al. |
| 10,460,053 | B2 | 10/2019 | Olson et al. |
| 10,467,459 | B2 | 11/2019 | Chen et al. |
| 10,468,008 | B2 | 11/2019 | Beckman et al. |
| 10,468,062 | B1 | 11/2019 | Levinson et al. |
| 10,470,510 | B1 | 11/2019 | Koh et al. |
| 10,474,160 | B2 | 11/2019 | Huang et al. |
| 10,474,161 | B2 | 11/2019 | Huang et al. |
| 10,474,928 | B2 | 11/2019 | Sivakumar et al. |
| 10,489,126 | B2 | 11/2019 | Kumar et al. |
| 10,489,972 | B2 | 11/2019 | Atsmon |
| 10,503,971 | B1 | 12/2019 | Dang et al. |
| 10,514,711 | B2 | 12/2019 | Bar-Nahum et al. |
| 10,528,824 | B2 | 1/2020 | Zou |
| 10,529,078 | B2 | 1/2020 | Abreu et al. |
| 10,529,088 | B2 | 1/2020 | Fine et al. |
| 10,534,854 | B2 | 1/2020 | Sharma et al. |
| 10,535,191 | B2 | 1/2020 | Sachdeva et al. |
| 10,542,930 | B1 | 1/2020 | Sanchez et al. |
| 10,546,197 | B2 | 1/2020 | Shrestha et al. |
| 10,546,217 | B2 | 1/2020 | Albright et al. |
| 10,552,682 | B2 | 2/2020 | Jonsson et al. |
| 10,559,386 | B1 | 2/2020 | Neuman |
| 10,565,475 | B2 | 2/2020 | Lecue et al. |
| 10,567,674 | B2 | 2/2020 | Kirsch |
| 10,568,570 | B1 | 2/2020 | Sherpa et al. |
| 10,572,717 | B1 | 2/2020 | Zhu et al. |
| 10,574,905 | B2 | 2/2020 | Srikanth et al. |
| 10,579,058 | B2 | 3/2020 | Oh et al. |
| 10,579,063 | B2 | 3/2020 | Haynes et al. |
| 10,579,897 | B2 | 3/2020 | Redmon et al. |
| 10,586,280 | B2 | 3/2020 | McKenna et al. |
| 10,591,914 | B2 | 3/2020 | Palanisamy et al. |
| 10,592,785 | B2 | 3/2020 | Zhu et al. |
| 10,599,701 | B2 | 3/2020 | Liu |
| 10,599,930 | B2 | 3/2020 | Lee et al. |
| 10,599,958 | B2 | 3/2020 | He et al. |
| 10,606,990 | B2 | 3/2020 | Tuli et al. |
| 10,609,434 | B2 | 3/2020 | Singhai et al. |
| 10,614,344 | B2 | 4/2020 | Anthony et al. |
| 10,621,513 | B2 | 4/2020 | Deshpande et al. |
| 10,627,818 | B2 | 4/2020 | Sapp et al. |
| 10,628,432 | B2 | 4/2020 | Guo et al. |
| 10,628,686 | B2 | 4/2020 | Ogale et al. |
| 10,628,688 | B1 | 4/2020 | Kim et al. |
| 10,629,080 | B2 | 4/2020 | Kazemi et al. |
| 10,636,161 | B2 | 4/2020 | Uchigaito |
| 10,636,169 | B2 | 4/2020 | Estrada et al. |
| 10,642,275 | B2 | 5/2020 | Silva et al. |
| 10,645,344 | B2 | 5/2020 | Marman et al. |
| 10,649,464 | B2 | 5/2020 | Gray |
| 10,650,071 | B2 | 5/2020 | Asgekar et al. |
| 10,652,565 | B1 | 5/2020 | Zhang et al. |
| 10,656,657 | B2 | 5/2020 | Djuric et al. |
| 10,657,391 | B2 | 5/2020 | Chen et al. |
| 10,657,418 | B2 | 5/2020 | Marder et al. |
| 10,657,934 | B1 | 5/2020 | Kolen et al. |
| 10,661,902 | B1 | 5/2020 | Tavshikar |
| 10,664,750 | B2 | 5/2020 | Greene |
| 10,671,082 | B2 | 6/2020 | Huang et al. |
| 10,671,886 | B2 | 6/2020 | Price et al. |
| 10,678,244 | B2 | 6/2020 | Iandola et al. |
| 10,678,839 | B2 | 6/2020 | Gordon et al. |
| 10,678,997 | B2 | 6/2020 | Ahuja et al. |
| 10,679,129 | B2 | 6/2020 | Baker |
| 10,685,159 | B2 | 6/2020 | Su et al. |
| 10,685,188 | B1 | 6/2020 | Zhang et al. |
| 10,692,000 | B2 | 6/2020 | Surazhsky et al. |
| 10,692,242 | B1 | 6/2020 | Morrison et al. |
| 10,693,740 | B2 | 6/2020 | Coccia et al. |
| 10,698,868 | B2 | 6/2020 | Guggilla et al. |
| 10,699,119 | B2 | 6/2020 | Lo et al. |
| 10,699,140 | B2 | 6/2020 | Kench et al. |

(56) References Cited

U.S. PATENT DOCUMENTS

| | | |
|---|---|---|
| 10,699,477 B2 | 6/2020 | Levinson et al. |
| 10,713,502 B2 | 7/2020 | Tiziani |
| 10,719,759 B2 | 7/2020 | Kutliroff |
| 10,725,475 B2 | 7/2020 | Yang et al. |
| 10,726,264 B2 | 7/2020 | Sawhney et al. |
| 10,726,279 B1 | 7/2020 | Kim et al. |
| 10,726,374 B1 | 7/2020 | Engineer et al. |
| 10,732,261 B1 | 8/2020 | Wang et al. |
| 10,733,262 B2 | 8/2020 | Miller et al. |
| 10,733,482 B1 | 8/2020 | Lee et al. |
| 10,733,638 B1 | 8/2020 | Jain et al. |
| 10,733,755 B2 | 8/2020 | Liao et al. |
| 10,733,876 B2 | 8/2020 | Moura et al. |
| 10,740,563 B2 | 8/2020 | Dugan |
| 10,740,914 B2 | 8/2020 | Xiao et al. |
| 10,748,062 B2 | 8/2020 | Rippel et al. |
| 10,748,247 B2 | 8/2020 | Paluri |
| 10,751,879 B2 | 8/2020 | Li et al. |
| 10,755,112 B2 | 8/2020 | Mabuchi |
| 10,755,575 B2 | 8/2020 | Johnston et al. |
| 10,757,330 B2 | 8/2020 | Ashrafi |
| 10,762,396 B2 | 9/2020 | Vallespi et al. |
| 10,768,628 B2 | 9/2020 | Martin et al. |
| 10,768,629 B2 | 9/2020 | Song et al. |
| 10,769,446 B2 | 9/2020 | Chang et al. |
| 10,769,483 B2 | 9/2020 | Nirenberg et al. |
| 10,769,493 B2 | 9/2020 | Yu et al. |
| 10,769,494 B2 | 9/2020 | Xiao et al. |
| 10,769,525 B2 | 9/2020 | Redding et al. |
| 10,776,626 B1 | 9/2020 | Lin et al. |
| 10,776,673 B2 | 9/2020 | Kim et al. |
| 10,776,939 B2 | 9/2020 | Ma et al. |
| 10,779,760 B2 | 9/2020 | Lee et al. |
| 10,783,381 B2 | 9/2020 | Yu et al. |
| 10,783,454 B2 | 9/2020 | Shoaib et al. |
| 10,789,402 B1 | 9/2020 | Vemuri et al. |
| 10,789,544 B2 | 9/2020 | Fiedel et al. |
| 10,790,919 B1 | 9/2020 | Kolen et al. |
| 10,796,221 B2 | 10/2020 | Zhang et al. |
| 10,796,355 B1 | 10/2020 | Price et al. |
| 10,796,423 B2 | 10/2020 | Goja |
| 10,798,368 B2 | 10/2020 | Briggs et al. |
| 10,803,325 B2 | 10/2020 | Bai et al. |
| 10,803,328 B1 | 10/2020 | Bai et al. |
| 10,803,743 B2 | 10/2020 | Abari et al. |
| 10,805,629 B2 | 10/2020 | Liu et al. |
| 10,809,730 B2 | 10/2020 | Chintakindi |
| 10,810,445 B1 | 10/2020 | Kangaspunta |
| 10,816,346 B2 | 10/2020 | Wheeler et al. |
| 10,816,992 B2 | 10/2020 | Chen |
| 10,817,731 B2 | 10/2020 | Vallespi et al. |
| 10,817,732 B2 | 10/2020 | Porter et al. |
| 10,819,923 B1 | 10/2020 | McCauley et al. |
| 10,824,122 B2 | 11/2020 | Mummadi et al. |
| 10,824,862 B2 | 11/2020 | Qi et al. |
| 10,828,790 B2 | 11/2020 | Nemallan |
| 10,832,057 B2 | 11/2020 | Chan et al. |
| 10,832,093 B1 | 11/2020 | Taralova et al. |
| 10,832,414 B2 | 11/2020 | Pfeiffer |
| 10,832,418 B1 | 11/2020 | Karasev et al. |
| 10,833,785 B1 | 11/2020 | O'Shea et al. |
| 10,836,379 B2 | 11/2020 | Xiao et al. |
| 10,838,936 B2 | 11/2020 | Cohen |
| 10,839,230 B2 | 11/2020 | Charette et al. |
| 10,839,578 B2 | 11/2020 | Coppersmith et al. |
| 10,843,628 B2 | 11/2020 | Kawamoto et al. |
| 10,845,820 B2 | 11/2020 | Wheeler |
| 10,845,943 B1 | 11/2020 | Ansari et al. |
| 10,846,831 B2 | 11/2020 | Raduta |
| 10,846,888 B2 | 11/2020 | Kaplanyan et al. |
| 10,853,670 B2 | 12/2020 | Sholingar et al. |
| 10,853,739 B2 | 12/2020 | Truong et al. |
| 10,860,919 B2 | 12/2020 | Kanazawa et al. |
| 10,860,924 B2 | 12/2020 | Burger |
| 10,867,444 B2 | 12/2020 | Russell et al. |
| 10,871,444 B2 | 12/2020 | Al et al. |
| 10,871,782 B2 | 12/2020 | Milstein et al. |
| 10,872,204 B2 | 12/2020 | Zhu et al. |
| 10,872,254 B2 | 12/2020 | Mangla et al. |
| 10,872,326 B2 | 12/2020 | Garner |
| 10,872,531 B2 | 12/2020 | Liu et al. |
| 10,885,083 B2 | 1/2021 | Moeller-Bertram et al. |
| 10,887,433 B2 | 1/2021 | Fu et al. |
| 10,890,898 B2 | 1/2021 | Akella et al. |
| 10,891,715 B2 | 1/2021 | Li |
| 10,891,735 B2 | 1/2021 | Yang et al. |
| 10,893,070 B2 | 1/2021 | Wang et al. |
| 10,893,107 B1 | 1/2021 | Callari et al. |
| 10,896,763 B2 | 1/2021 | Kempanna et al. |
| 10,901,416 B2 | 1/2021 | Khanna et al. |
| 10,901,508 B2 | 1/2021 | Laszlo et al. |
| 10,902,551 B1 | 1/2021 | Mellado et al. |
| 10,908,068 B2 | 2/2021 | Amer et al. |
| 10,908,606 B2 | 2/2021 | Stein et al. |
| 10,909,368 B2 | 2/2021 | Guo et al. |
| 10,909,453 B1 | 2/2021 | Myers et al. |
| 10,915,783 B1 | 2/2021 | Hallman et al. |
| 10,917,522 B2 | 2/2021 | Segalis et al. |
| 10,921,817 B1 | 2/2021 | Kangaspunta |
| 10,922,578 B2 | 2/2021 | Banerjee et al. |
| 10,924,661 B2 | 2/2021 | Vasconcelos et al. |
| 10,928,508 B2 | 2/2021 | Swaminathan |
| 10,929,757 B2 | 2/2021 | Baker et al. |
| 10,930,065 B2 | 2/2021 | Grant et al. |
| 10,936,908 B1 | 3/2021 | Ho et al. |
| 10,937,186 B2 | 3/2021 | Wang et al. |
| 10,943,101 B2 | 3/2021 | Agarwal et al. |
| 10,943,132 B2 | 3/2021 | Wang et al. |
| 10,943,355 B2 | 3/2021 | Fagg et al. |
| 11,636,333 B2 * | 4/2023 | Sidhu .................. G05D 1/0214 706/25 |
| 2003/0035481 A1 | 2/2003 | Hahm |
| 2005/0162445 A1 | 7/2005 | Sheasby et al. |
| 2006/0072847 A1 | 4/2006 | Chor et al. |
| 2006/0224533 A1 | 10/2006 | Thaler |
| 2006/0280364 A1 | 12/2006 | Ma et al. |
| 2007/0156392 A1 * | 7/2007 | Balchandran ......... G06F 40/237 704/9 |
| 2009/0016571 A1 | 1/2009 | Tijerina et al. |
| 2010/0118157 A1 | 5/2010 | Kameyama |
| 2012/0042299 A1 | 2/2012 | Perrin |
| 2012/0109915 A1 | 5/2012 | Kamekawa |
| 2012/0110491 A1 | 5/2012 | Cheung |
| 2012/0134595 A1 | 5/2012 | Fonseca et al. |
| 2015/0104102 A1 | 4/2015 | Carreira et al. |
| 2015/0379429 A1 * | 12/2015 | Lee ....................... G09B 5/00 706/11 |
| 2016/0110657 A1 * | 4/2016 | Gibiansky .............. G06N 20/00 706/12 |
| 2016/0132786 A1 | 5/2016 | Balan et al. |
| 2016/0162456 A1 | 6/2016 | Munro |
| 2016/0328856 A1 | 11/2016 | Mannino et al. |
| 2017/0011281 A1 | 1/2017 | Dihkman et al. |
| 2017/0158219 A1 | 6/2017 | Shigemura |
| 2017/0193066 A1 * | 7/2017 | Zhu ....................... G06F 16/254 |
| 2017/0193392 A1 * | 7/2017 | Liu ........................ G06N 20/00 |
| 2017/0206434 A1 | 7/2017 | Nariyambut et al. |
| 2017/0364931 A1 | 12/2017 | Khavronin |
| 2018/0012411 A1 | 1/2018 | Richey et al. |
| 2018/0018590 A1 | 1/2018 | Szeto et al. |
| 2018/0039853 A1 | 2/2018 | Liu et al. |
| 2018/0067489 A1 | 3/2018 | Oder et al. |
| 2018/0068459 A1 | 3/2018 | Zhang et al. |
| 2018/0068540 A1 | 3/2018 | Romanenko et al. |
| 2018/0074506 A1 | 3/2018 | Branson |
| 2018/0121762 A1 | 5/2018 | Han et al. |
| 2018/0150081 A1 | 5/2018 | Gross et al. |
| 2018/0181875 A1 * | 6/2018 | Motohashi ........... G06Q 30/0283 |
| 2018/0211403 A1 | 7/2018 | Hotson et al. |
| 2018/0308012 A1 | 10/2018 | Mummadi et al. |
| 2018/0314878 A1 | 11/2018 | Lee et al. |
| 2018/0357511 A1 | 12/2018 | Misra et al. |
| 2018/0374105 A1 | 12/2018 | Azout et al. |
| 2019/0023277 A1 | 1/2019 | Roger et al. |

(56) References Cited

U.S. PATENT DOCUMENTS

| | | |
|---|---|---|
| 2019/0025773 A1 | 1/2019 | Yang et al. |
| 2019/0042894 A1 | 2/2019 | Anderson |
| 2019/0042919 A1 | 2/2019 | Peysakhovich et al. |
| 2019/0042944 A1 | 2/2019 | Nair et al. |
| 2019/0042948 A1 | 2/2019 | Lee et al. |
| 2019/0043070 A1 | 2/2019 | Merrill |
| 2019/0057314 A1 | 2/2019 | Julian et al. |
| 2019/0065637 A1 | 2/2019 | Bogdoll et al. |
| 2019/0065989 A1* | 2/2019 | Kida ............... G06N 3/048 |
| 2019/0072978 A1 | 3/2019 | Levi |
| 2019/0079526 A1 | 3/2019 | Vallespi et al. |
| 2019/0080602 A1 | 3/2019 | Rice et al. |
| 2019/0095780 A1 | 3/2019 | Zhong et al. |
| 2019/0095946 A1 | 3/2019 | Azout et al. |
| 2019/0101914 A1 | 4/2019 | Coleman et al. |
| 2019/0108417 A1 | 4/2019 | Talagala et al. |
| 2019/0122111 A1 | 4/2019 | Min et al. |
| 2019/0130255 A1 | 5/2019 | Yim et al. |
| 2019/0130305 A1 | 5/2019 | Sivertson |
| 2019/0145765 A1 | 5/2019 | Luo et al. |
| 2019/0146497 A1 | 5/2019 | Urtasun et al. |
| 2019/0147112 A1 | 5/2019 | Gordon |
| 2019/0147250 A1 | 5/2019 | Zhang et al. |
| 2019/0147254 A1 | 5/2019 | Bai et al. |
| 2019/0147255 A1 | 5/2019 | Homayounfar et al. |
| 2019/0147335 A1 | 5/2019 | Wang et al. |
| 2019/0147372 A1 | 5/2019 | Luo et al. |
| 2019/0158784 A1 | 5/2019 | Ahn et al. |
| 2019/0179903 A1* | 6/2019 | Terry ............... G06N 3/004 |
| 2019/0180154 A1 | 6/2019 | Orlov et al. |
| 2019/0185010 A1 | 6/2019 | Ganguli et al. |
| 2019/0189251 A1 | 6/2019 | Horiuchi et al. |
| 2019/0197357 A1 | 6/2019 | Anderson et al. |
| 2019/0204842 A1 | 7/2019 | Jafari et al. |
| 2019/0205402 A1 | 7/2019 | Sernau et al. |
| 2019/0205667 A1 | 7/2019 | Avidan et al. |
| 2019/0217791 A1 | 7/2019 | Bradley et al. |
| 2019/0227562 A1 | 7/2019 | Mohammadiha et al. |
| 2019/0228037 A1 | 7/2019 | Nicol et al. |
| 2019/0230282 A1 | 7/2019 | Sypitkowski et al. |
| 2019/0235499 A1 | 8/2019 | Kazemi et al. |
| 2019/0236437 A1 | 8/2019 | Shin et al. |
| 2019/0243371 A1 | 8/2019 | Nister et al. |
| 2019/0244138 A1 | 8/2019 | Bhowmick et al. |
| 2019/0250622 A1 | 8/2019 | Nister et al. |
| 2019/0250626 A1 | 8/2019 | Ghafarianzadeh et al. |
| 2019/0250640 A1 | 8/2019 | O'Flaherty et al. |
| 2019/0258878 A1 | 8/2019 | Koivisto et al. |
| 2019/0266418 A1 | 8/2019 | Xu et al. |
| 2019/0266610 A1 | 8/2019 | Ghatage et al. |
| 2019/0272446 A1 | 9/2019 | Kangaspunta et al. |
| 2019/0276041 A1 | 9/2019 | Choi et al. |
| 2019/0279004 A1 | 9/2019 | Kwon et al. |
| 2019/0286652 A1 | 9/2019 | Habbecke et al. |
| 2019/0286972 A1 | 9/2019 | El Husseini et al. |
| 2019/0287028 A1 | 9/2019 | St Amant et al. |
| 2019/0289281 A1 | 9/2019 | Badrinarayanan et al. |
| 2019/0294177 A1 | 9/2019 | Kwon et al. |
| 2019/0294975 A1 | 9/2019 | Sachs |
| 2019/0311290 A1 | 10/2019 | Huang et al. |
| 2019/0318099 A1 | 10/2019 | Carvalho et al. |
| 2019/0325088 A1 | 10/2019 | Dubey et al. |
| 2019/0325266 A1 | 10/2019 | Klepper et al. |
| 2019/0325269 A1 | 10/2019 | Bagherinezhad et al. |
| 2019/0325580 A1 | 10/2019 | Lukac et al. |
| 2019/0325595 A1 | 10/2019 | Stein et al. |
| 2019/0329790 A1 | 10/2019 | Nandakumar et al. |
| 2019/0332875 A1 | 10/2019 | Vallespi-Gonzalez et al. |
| 2019/0333232 A1 | 10/2019 | Vallespi-Gonzalez et al. |
| 2019/0336063 A1 | 11/2019 | Dascalu |
| 2019/0339989 A1 | 11/2019 | Liang et al. |
| 2019/0340462 A1 | 11/2019 | Pao et al. |
| 2019/0340492 A1 | 11/2019 | Burger et al. |
| 2019/0340499 A1 | 11/2019 | Burger et al. |
| 2019/0340524 A1* | 11/2019 | Kirchhoff ............... G06N 5/043 |
| 2019/0347501 A1 | 11/2019 | Kim et al. |
| 2019/0349571 A1 | 11/2019 | Herman et al. |
| 2019/0354782 A1 | 11/2019 | Kee et al. |
| 2019/0354786 A1 | 11/2019 | Lee et al. |
| 2019/0354808 A1 | 11/2019 | Park et al. |
| 2019/0354817 A1 | 11/2019 | Shlens et al. |
| 2019/0354850 A1 | 11/2019 | Watson et al. |
| 2019/0370398 A1 | 12/2019 | He et al. |
| 2019/0370575 A1 | 12/2019 | Nandakumar et al. |
| 2019/0370935 A1 | 12/2019 | Chang et al. |
| 2019/0373322 A1 | 12/2019 | Rojas-Echenique et al. |
| 2019/0377345 A1 | 12/2019 | Bachrach et al. |
| 2019/0377965 A1 | 12/2019 | Totolos et al. |
| 2019/0378049 A1 | 12/2019 | Widmann et al. |
| 2019/0378051 A1 | 12/2019 | Widmann et al. |
| 2019/0382007 A1 | 12/2019 | Casas et al. |
| 2019/0384303 A1 | 12/2019 | Muller et al. |
| 2019/0384304 A1 | 12/2019 | Towal et al. |
| 2019/0384309 A1 | 12/2019 | Silva et al. |
| 2019/0384994 A1 | 12/2019 | Frossard et al. |
| 2019/0385048 A1 | 12/2019 | Cassidy et al. |
| 2019/0385360 A1 | 12/2019 | Yang et al. |
| 2020/0004259 A1 | 1/2020 | Gulino et al. |
| 2020/0004351 A1 | 1/2020 | Marchant et al. |
| 2020/0012936 A1 | 1/2020 | Lee et al. |
| 2020/0017117 A1 | 1/2020 | Milton |
| 2020/0025931 A1 | 1/2020 | Liang et al. |
| 2020/0026282 A1 | 1/2020 | Choe et al. |
| 2020/0026283 A1 | 1/2020 | Barnes et al. |
| 2020/0026992 A1 | 1/2020 | Zhang et al. |
| 2020/0027210 A1 | 1/2020 | Haemel et al. |
| 2020/0033858 A1 | 1/2020 | Xiao |
| 2020/0033865 A1 | 1/2020 | Mellinger et al. |
| 2020/0034665 A1 | 1/2020 | Ghanta et al. |
| 2020/0034710 A1 | 1/2020 | Sidhu et al. |
| 2020/0036948 A1 | 1/2020 | Song |
| 2020/0039520 A1 | 2/2020 | Misu et al. |
| 2020/0051550 A1 | 2/2020 | Baker |
| 2020/0060757 A1 | 2/2020 | Ben-Haim et al. |
| 2020/0065711 A1 | 2/2020 | Clément et al. |
| 2020/0065879 A1 | 2/2020 | Hu et al. |
| 2020/0069973 A1 | 3/2020 | Lou et al. |
| 2020/0073385 A1 | 3/2020 | Jobanputra et al. |
| 2020/0074230 A1 | 3/2020 | Englard et al. |
| 2020/0086880 A1 | 3/2020 | Poeppel et al. |
| 2020/0089243 A1 | 3/2020 | Poeppel et al. |
| 2020/0089969 A1 | 3/2020 | Lakshmi et al. |
| 2020/0090056 A1 | 3/2020 | Singhal et al. |
| 2020/0097841 A1 | 3/2020 | Petousis et al. |
| 2020/0098095 A1 | 3/2020 | Borcs et al. |
| 2020/0103894 A1 | 4/2020 | Cella et al. |
| 2020/0104705 A1 | 4/2020 | Bhowmick et al. |
| 2020/0110416 A1 | 4/2020 | Hong et al. |
| 2020/0117180 A1 | 4/2020 | Cella et al. |
| 2020/0117889 A1 | 4/2020 | Laput et al. |
| 2020/0117916 A1 | 4/2020 | Liu |
| 2020/0117917 A1 | 4/2020 | Yoo |
| 2020/0118035 A1 | 4/2020 | Asawa et al. |
| 2020/0125844 A1 | 4/2020 | She et al. |
| 2020/0125845 A1 | 4/2020 | Hess et al. |
| 2020/0126129 A1 | 4/2020 | Lkhamsuren et al. |
| 2020/0134427 A1 | 4/2020 | Oh et al. |
| 2020/0134461 A1 | 4/2020 | Chai et al. |
| 2020/0134466 A1 | 4/2020 | Weintraub et al. |
| 2020/0134848 A1 | 4/2020 | El-Khamy et al. |
| 2020/0143231 A1 | 5/2020 | Fusi et al. |
| 2020/0143279 A1 | 5/2020 | West et al. |
| 2020/0148201 A1 | 5/2020 | King et al. |
| 2020/0149898 A1 | 5/2020 | Felip et al. |
| 2020/0151201 A1 | 5/2020 | Chandrasekhar et al. |
| 2020/0151619 A1 | 5/2020 | Mopur et al. |
| 2020/0151692 A1 | 5/2020 | Gao et al. |
| 2020/0158822 A1 | 5/2020 | Owens et al. |
| 2020/0158869 A1 | 5/2020 | Amirloo et al. |
| 2020/0159225 A1 | 5/2020 | Zeng et al. |
| 2020/0160064 A1 | 5/2020 | Wang et al. |
| 2020/0160104 A1 | 5/2020 | Urtasun et al. |
| 2020/0160117 A1 | 5/2020 | Urtasun et al. |
| 2020/0160178 A1 | 5/2020 | Kar et al. |

(56) References Cited

U.S. PATENT DOCUMENTS

| | | |
|---|---|---|
| 2020/0160532 A1 | 5/2020 | Urtasun et al. |
| 2020/0160558 A1 | 5/2020 | Urtasun et al. |
| 2020/0160559 A1 | 5/2020 | Urtasun et al. |
| 2020/0160598 A1 | 5/2020 | Manivasagam et al. |
| 2020/0162489 A1 | 5/2020 | Bar-Nahum et al. |
| 2020/0167438 A1 | 5/2020 | Herring |
| 2020/0167554 A1 | 5/2020 | Wang et al. |
| 2020/0174481 A1 | 6/2020 | Van Heukelom et al. |
| 2020/0175326 A1 | 6/2020 | Shen et al. |
| 2020/0175354 A1 | 6/2020 | Volodarskiy et al. |
| 2020/0175371 A1 | 6/2020 | Kursun |
| 2020/0175401 A1 | 6/2020 | Shen |
| 2020/0183482 A1 | 6/2020 | Sebot et al. |
| 2020/0184250 A1 | 6/2020 | Oko |
| 2020/0184333 A1 | 6/2020 | Oh |
| 2020/0192389 A1 | 6/2020 | ReMine et al. |
| 2020/0193313 A1 | 6/2020 | Ghanta et al. |
| 2020/0193328 A1 | 6/2020 | Guestrin et al. |
| 2020/0202136 A1 | 6/2020 | Shrestha et al. |
| 2020/0202196 A1 | 6/2020 | Guo et al. |
| 2020/0209857 A1 | 7/2020 | Djuric et al. |
| 2020/0209867 A1 | 7/2020 | Valois et al. |
| 2020/0209874 A1 | 7/2020 | Chen et al. |
| 2020/0210717 A1 | 7/2020 | Hou et al. |
| 2020/0210769 A1 | 7/2020 | Hou et al. |
| 2020/0210777 A1 | 7/2020 | Valois et al. |
| 2020/0216064 A1 | 7/2020 | du Toit et al. |
| 2020/0218722 A1 | 7/2020 | Mai et al. |
| 2020/0218979 A1 | 7/2020 | Kwon et al. |
| 2020/0223434 A1 | 7/2020 | Campos et al. |
| 2020/0225758 A1 | 7/2020 | Tang et al. |
| 2020/0226377 A1 | 7/2020 | Campos et al. |
| 2020/0226430 A1 | 7/2020 | Ahuja et al. |
| 2020/0238998 A1 | 7/2020 | Dasalukunte et al. |
| 2020/0242381 A1 | 7/2020 | Chao et al. |
| 2020/0242408 A1 | 7/2020 | Kim et al. |
| 2020/0242511 A1 | 7/2020 | Kale et al. |
| 2020/0245869 A1 | 8/2020 | Sivan et al. |
| 2020/0249685 A1 | 8/2020 | Elluswamy et al. |
| 2020/0250456 A1 | 8/2020 | Wang et al. |
| 2020/0250515 A1 | 8/2020 | Rifkin et al. |
| 2020/0250874 A1 | 8/2020 | Assouline et al. |
| 2020/0257301 A1 | 8/2020 | Weiser et al. |
| 2020/0257306 A1 | 8/2020 | Nisenzon |
| 2020/0258057 A1 | 8/2020 | Farahat et al. |
| 2020/0265247 A1 | 8/2020 | Musk et al. |
| 2020/0272160 A1 | 8/2020 | Djuric et al. |
| 2020/0272162 A1 | 8/2020 | Hasselgren et al. |
| 2020/0272859 A1 | 8/2020 | Iashyn et al. |
| 2020/0273231 A1 | 8/2020 | Schied et al. |
| 2020/0279354 A1 | 9/2020 | Klaiman |
| 2020/0279364 A1 | 9/2020 | Sarkisian et al. |
| 2020/0279371 A1 | 9/2020 | Wenzel et al. |
| 2020/0285464 A1 | 9/2020 | Brebner |
| 2020/0286256 A1 | 9/2020 | Houts et al. |
| 2020/0293786 A1 | 9/2020 | Jia et al. |
| 2020/0293796 A1 | 9/2020 | Sajjadi et al. |
| 2020/0293828 A1 | 9/2020 | Wang et al. |
| 2020/0293905 A1 | 9/2020 | Huang et al. |
| 2020/0294162 A1 | 9/2020 | Shah |
| 2020/0294257 A1 | 9/2020 | Yoo et al. |
| 2020/0294310 A1 | 9/2020 | Lee et al. |
| 2020/0297237 A1 | 9/2020 | Tamersoy et al. |
| 2020/0298891 A1 | 9/2020 | Liang et al. |
| 2020/0301799 A1 | 9/2020 | Manivasagam et al. |
| 2020/0302276 A1 | 9/2020 | Yang et al. |
| 2020/0302291 A1 | 9/2020 | Hong |
| 2020/0302627 A1 | 9/2020 | Duggal et al. |
| 2020/0302662 A1 | 9/2020 | Homayounfar et al. |
| 2020/0304441 A1 | 9/2020 | Bradley et al. |
| 2020/0306640 A1 | 10/2020 | Kolen et al. |
| 2020/0307562 A1 | 10/2020 | Ghafarianzadeh et al. |
| 2020/0307563 A1 | 10/2020 | Ghafarianzadeh et al. |
| 2020/0309536 A1 | 10/2020 | Omari et al. |
| 2020/0309923 A1 | 10/2020 | Bhaskaran et al. |
| 2020/0310442 A1 | 10/2020 | Halder et al. |
| 2020/0311601 A1 | 10/2020 | Robinson et al. |
| 2020/0312003 A1 | 10/2020 | Borovikov et al. |
| 2020/0315708 A1 | 10/2020 | Mosnier et al. |
| 2020/0320132 A1 | 10/2020 | Neumann |
| 2020/0324073 A1 | 10/2020 | Rajan et al. |
| 2020/0327192 A1 | 10/2020 | Hackman et al. |
| 2020/0327443 A1 | 10/2020 | Van et al. |
| 2020/0327449 A1 | 10/2020 | Tiwari et al. |
| 2020/0327662 A1 | 10/2020 | Liu et al. |
| 2020/0327667 A1 | 10/2020 | Arbel et al. |
| 2020/0331476 A1 | 10/2020 | Chen et al. |
| 2020/0334416 A1 | 10/2020 | Vianu et al. |
| 2020/0334495 A1 | 10/2020 | Al et al. |
| 2020/0334501 A1 | 10/2020 | Lin et al. |
| 2020/0334551 A1 | 10/2020 | Javidi et al. |
| 2020/0334574 A1 | 10/2020 | Ishida |
| 2020/0337648 A1 | 10/2020 | Saripalli et al. |
| 2020/0341466 A1 | 10/2020 | Pham et al. |
| 2020/0342350 A1 | 10/2020 | Madar et al. |
| 2020/0342548 A1 | 10/2020 | Mazed et al. |
| 2020/0342652 A1 | 10/2020 | Rowell et al. |
| 2020/0348909 A1 | 11/2020 | Das Sarma et al. |
| 2020/0350063 A1 | 11/2020 | Thornton et al. |
| 2020/0351438 A1 | 11/2020 | Dewhurst et al. |
| 2020/0356107 A1 | 11/2020 | Wells |
| 2020/0356790 A1 | 11/2020 | Jaipuria et al. |
| 2020/0356864 A1 | 11/2020 | Neumann |
| 2020/0356905 A1 | 11/2020 | Luk et al. |
| 2020/0361083 A1 | 11/2020 | Mousavian et al. |
| 2020/0361485 A1 | 11/2020 | Zhu et al. |
| 2020/0364481 A1 | 11/2020 | Kornienko et al. |
| 2020/0364508 A1 | 11/2020 | Gurel et al. |
| 2020/0364540 A1 | 11/2020 | Elsayed et al. |
| 2020/0364746 A1 | 11/2020 | Longano et al. |
| 2020/0364953 A1 | 11/2020 | Simoudis |
| 2020/0372362 A1 | 11/2020 | Kim |
| 2020/0372402 A1 | 11/2020 | Kursun et al. |
| 2020/0380362 A1 | 12/2020 | Cao et al. |
| 2020/0380383 A1 | 12/2020 | Kwong et al. |
| 2020/0393841 A1 | 12/2020 | Frisbie et al. |
| 2020/0394421 A1 | 12/2020 | Yu et al. |
| 2020/0394457 A1 | 12/2020 | Brady |
| 2020/0394495 A1 | 12/2020 | Moudgill et al. |
| 2020/0394813 A1 | 12/2020 | Theverapperuma et al. |
| 2020/0396394 A1 | 12/2020 | Zlokolica et al. |
| 2020/0398855 A1 | 12/2020 | Thompson |
| 2020/0401850 A1 | 12/2020 | Bazarsky et al. |
| 2020/0401886 A1 | 12/2020 | Deng et al. |
| 2020/0402155 A1 | 12/2020 | Kurian et al. |
| 2020/0402226 A1 | 12/2020 | Peng |
| 2020/0410012 A1 | 12/2020 | Moon et al. |
| 2020/0410224 A1 | 12/2020 | Goel |
| 2020/0410254 A1 | 12/2020 | Pham et al. |
| 2020/0410288 A1 | 12/2020 | Capota et al. |
| 2020/0410751 A1 | 12/2020 | Omari et al. |
| 2021/0004014 A1 | 1/2021 | Sivakumar |
| 2021/0004580 A1 | 1/2021 | Sundararaman et al. |
| 2021/0004611 A1 | 1/2021 | Garimella et al. |
| 2021/0004663 A1 | 1/2021 | Park et al. |
| 2021/0006835 A1 | 1/2021 | Slattery et al. |
| 2021/0011908 A1 | 1/2021 | Hayes et al. |
| 2021/0012116 A1 | 1/2021 | Urtasun et al. |
| 2021/0012210 A1 | 1/2021 | Sikka et al. |
| 2021/0012230 A1 | 1/2021 | Hayes et al. |
| 2021/0012239 A1 | 1/2021 | Arzani et al. |
| 2021/0015240 A1 | 1/2021 | Elfakhri et al. |
| 2021/0019215 A1 | 1/2021 | Neeter |
| 2021/0026360 A1 | 1/2021 | Luo |
| 2021/0027112 A1 | 1/2021 | Brewington et al. |
| 2021/0027117 A1 | 1/2021 | McGavran et al. |
| 2021/0030276 A1 | 2/2021 | Li et al. |
| 2021/0034921 A1 | 2/2021 | Pinkovich et al. |
| 2021/0042575 A1 | 2/2021 | Firner |
| 2021/0042928 A1 | 2/2021 | Takeda et al. |
| 2021/0046954 A1 | 2/2021 | Haynes |
| 2021/0049378 A1 | 2/2021 | Gautam et al. |
| 2021/0049455 A1 | 2/2021 | Kursun |
| 2021/0049456 A1 | 2/2021 | Kursun |

(56) References Cited

U.S. PATENT DOCUMENTS

| | | |
|---|---|---|
| 2021/0049548 A1 | 2/2021 | Grisz et al. |
| 2021/0049700 A1 | 2/2021 | Nguyen et al. |
| 2021/0056114 A1 | 2/2021 | Price et al. |
| 2021/0056306 A1 | 2/2021 | Hu et al. |
| 2021/0056317 A1 | 2/2021 | Golov |
| 2021/0056420 A1 | 2/2021 | Konishi et al. |
| 2021/0056701 A1 | 2/2021 | Vranceanu et al. |

FOREIGN PATENT DOCUMENTS

| | | |
|---|---|---|
| CN | 110599537 A | 12/2010 |
| CN | 102737236 A | 10/2012 |
| CN | 103366339 A | 10/2013 |
| CN | 104835114 A | 8/2015 |
| CN | 103236037 B | 5/2016 |
| CN | 103500322 B | 8/2016 |
| CN | 106419893 A | 2/2017 |
| CN | 106504253 A | 3/2017 |
| CN | 107031600 A | 8/2017 |
| CN | 107169421 A | 9/2017 |
| CN | 107507134 A | 12/2017 |
| CN | 107885214 A | 4/2018 |
| CN | 108122234 A | 6/2018 |
| CN | 107133943 B | 7/2018 |
| CN | 107368926 B | 7/2018 |
| CN | 105318888 B | 8/2018 |
| CN | 108491889 A | 9/2018 |
| CN | 108647591 A | 10/2018 |
| CN | 108710865 A | 10/2018 |
| CN | 105550701 B | 11/2018 |
| CN | 108764185 A | 11/2018 |
| CN | 108845574 A | 11/2018 |
| CN | 108898177 A | 11/2018 |
| CN | 109086867 A | 12/2018 |
| CN | 107103113 B | 1/2019 |
| CN | 109215067 A | 1/2019 |
| CN | 109359731 A | 2/2019 |
| CN | 109389207 A | 2/2019 |
| CN | 109389552 A | 2/2019 |
| CN | 106779060 B | 3/2019 |
| CN | 109579856 A | 4/2019 |
| CN | 109615073 A | 4/2019 |
| CN | 106156754 B | 5/2019 |
| CN | 106598226 B | 5/2019 |
| CN | 106650922 B | 5/2019 |
| CN | 109791626 A | 5/2019 |
| CN | 109901595 A | 6/2019 |
| CN | 109902732 A | 6/2019 |
| CN | 109934163 A | 6/2019 |
| CN | 109948428 A | 6/2019 |
| CN | 109949257 A | 6/2019 |
| CN | 109951710 A | 6/2019 |
| CN | 109975308 A | 7/2019 |
| CN | 109978132 A | 7/2019 |
| CN | 109978161 A | 7/2019 |
| CN | 110060202 A | 7/2019 |
| CN | 110069071 A | 7/2019 |
| CN | 110084086 A | 8/2019 |
| CN | 110096937 A | 8/2019 |
| CN | 110111340 A | 8/2019 |
| CN | 110135485 A | 8/2019 |
| CN | 110197270 B | 9/2019 |
| CN | 110310264 A | 10/2019 |
| CN | 110321965 A | 10/2019 |
| CN | 110334801 A | 10/2019 |
| CN | 110399875 A | 11/2019 |
| CN | 110414362 A | 11/2019 |
| CN | 110426051 A | 11/2019 |
| CN | 110473173 A | 11/2019 |
| CN | 110516665 A | 11/2019 |
| CN | 110543837 A | 12/2019 |
| CN | 110569899 A | 12/2019 |
| CN | 110599864 A | 12/2019 |
| CN | 110619282 A | 12/2019 |
| CN | 110619283 A | 12/2019 |
| CN | 110619330 A | 12/2019 |
| CN | 110659628 A | 1/2020 |
| CN | 110688992 A | 1/2020 |
| CN | 107742311 B | 2/2020 |
| CN | 110751280 A | 2/2020 |
| CN | 110826566 A | 2/2020 |
| CN | 107451659 B | 4/2020 |
| CN | 108111873 B | 4/2020 |
| CN | 110956185 A | 4/2020 |
| CN | 110966991 A | 4/2020 |
| CN | 111027549 A | 4/2020 |
| CN | 111027575 A | 4/2020 |
| CN | 111047225 A | 4/2020 |
| CN | 111126453 A | 5/2020 |
| CN | 111158355 A | 5/2020 |
| CN | 107729998 B | 6/2020 |
| CN | 108549934 B | 6/2020 |
| CN | 111275129 A | 6/2020 |
| CN | 111275618 A | 6/2020 |
| CN | 111326023 A | 6/2020 |
| CN | 111428943 A | 7/2020 |
| CN | 111444821 A | 7/2020 |
| CN | 111445420 A | 7/2020 |
| CN | 111461052 A | 7/2020 |
| CN | 111461053 A | 7/2020 |
| CN | 111461110 A | 7/2020 |
| CN | 110225341 B | 8/2020 |
| CN | 111307162 B | 8/2020 |
| CN | 111488770 A | 8/2020 |
| CN | 111539514 A | 8/2020 |
| CN | 111565318 A | 8/2020 |
| CN | 111582216 A | 8/2020 |
| CN | 111598095 A | 8/2020 |
| CN | 108229526 B | 9/2020 |
| CN | 111693972 A | 9/2020 |
| CN | 106558058 B | 10/2020 |
| CN | 107169560 B | 10/2020 |
| CN | 107622258 B | 10/2020 |
| CN | 111767801 A | 10/2020 |
| CN | 111768002 A | 10/2020 |
| CN | 111783545 A | 10/2020 |
| CN | 111783971 A | 10/2020 |
| CN | 111797657 A | 10/2020 |
| CN | 111814623 A | 10/2020 |
| CN | 111814902 A | 10/2020 |
| CN | 111860499 A | 10/2020 |
| CN | 111881856 A | 11/2020 |
| CN | 111882579 A | 11/2020 |
| CN | 111897639 A | 11/2020 |
| CN | 111898507 A | 11/2020 |
| CN | 111898523 A | 11/2020 |
| CN | 111899227 A | 11/2020 |
| CN | 112101175 A | 12/2020 |
| CN | 112101562 A | 12/2020 |
| CN | 112115953 A | 12/2020 |
| CN | 111062973 B | 1/2021 |
| CN | 111275080 B | 1/2021 |
| CN | 112183739 A | 1/2021 |
| CN | 112232497 A | 1/2021 |
| CN | 112288658 A | 1/2021 |
| CN | 112308095 A | 2/2021 |
| CN | 112308799 A | 2/2021 |
| CN | 112313663 A | 2/2021 |
| CN | 112329552 A | 2/2021 |
| CN | 112348783 A | 2/2021 |
| CN | 111899245 B | 3/2021 |
| DE | 202017102235 U1 | 5/2017 |
| DE | 202017102238 U1 | 5/2017 |
| DE | 102017116017 A1 | 1/2019 |
| DE | 102018130821 A1 | 6/2020 |
| DE | 102019008316 A1 | 8/2020 |
| EP | 1215626 B1 | 9/2008 |
| EP | 2228666 B1 | 9/2012 |
| EP | 2420408 B1 | 5/2013 |
| EP | 2723069 A1 | 4/2014 |
| EP | 2741253 A1 | 6/2014 |
| EP | 3115772 A1 | 1/2017 |
| EP | 2618559 B1 | 8/2017 |
| EP | 3285485 A1 | 2/2018 |

(56) References Cited

FOREIGN PATENT DOCUMENTS

| | | | |
|---|---|---|---|
| EP | 2863633 | B1 | 2/2019 |
| EP | 3113080 | B1 | 5/2019 |
| EP | 3525132 | A1 | 8/2019 |
| EP | 3531689 | A1 | 8/2019 |
| EP | 3537340 | A1 | 9/2019 |
| EP | 3543917 | A1 | 9/2019 |
| EP | 3608840 | A1 | 2/2020 |
| EP | 3657387 | A1 | 5/2020 |
| EP | 2396750 | B1 | 6/2020 |
| EP | 3664020 | A1 | 6/2020 |
| EP | 3690712 | A1 | 8/2020 |
| EP | 3690742 | A1 | 8/2020 |
| EP | 3722992 | A1 | 10/2020 |
| EP | 3690730 | A2 | 11/2020 |
| EP | 3739486 | A1 | 11/2020 |
| EP | 3501897 | B1 | 12/2020 |
| EP | 3751455 | A2 | 12/2020 |
| EP | 3783527 | A1 | 2/2021 |
| GB | 2402572 | B | 8/2005 |
| GB | 2548087 | A | 9/2017 |
| GB | 2577485 | A | 4/2020 |
| GB | 2517270 | B | 6/2020 |
| JP | 2578262 | Y2 | 8/1998 |
| JP | 3941252 | B2 | 7/2007 |
| JP | 4282583 | B2 | 6/2009 |
| JP | 4300098 | B2 | 7/2009 |
| JP | 2015004922 | A | 1/2015 |
| JP | 5863536 | B2 | 2/2016 |
| JP | 6044134 | B2 | 12/2016 |
| JP | 6525707 | B2 | 6/2019 |
| JP | 2019101535 | A | 6/2019 |
| JP | 2020101927 | A | 7/2020 |
| JP | 2020173744 | A | 10/2020 |
| KR | 100326702 | B1 | 2/2002 |
| KR | 101082878 | B1 | 11/2011 |
| KR | 101738422 | B1 | 5/2017 |
| KR | 101969864 | B1 | 4/2019 |
| KR | 101996167 | B1 | 7/2019 |
| KR | 102022388 | B1 | 8/2019 |
| KR | 102043143 | B1 | 11/2019 |
| KR | 102095335 | B1 | 3/2020 |
| KR | 102097120 | B1 | 4/2020 |
| KR | 1020200085490 | A | 7/2020 |
| KR | 102189262 | B1 | 12/2020 |
| KR | 1020200142266 | A | 12/2020 |
| TW | 200630819 | A | 9/2006 |
| TW | I294089 | B | 3/2008 |
| TW | I306207 | B | 2/2009 |
| WO | WO 02/052835 | | 7/2002 |
| WO | WO 16/032398 | | 3/2016 |
| WO | WO 16/048108 | | 3/2016 |
| WO | WO 16/207875 | | 12/2016 |
| WO | WO 17/158622 | | 9/2017 |
| WO | WO 19/005547 | | 1/2019 |
| WO | WO 19/067695 | | 4/2019 |
| WO | WO 19/089339 | | 5/2019 |
| WO | WO 19/092456 | | 5/2019 |
| WO | WO 19/099622 | | 5/2019 |
| WO | WO 19/122952 | | 6/2019 |
| WO | WO 19/125191 | | 6/2019 |
| WO | WO 19/126755 | | 6/2019 |
| WO | WO 19/144575 | | 8/2019 |
| WO | WO 19/182782 | | 9/2019 |
| WO | WO 19/191578 | | 10/2019 |
| WO | WO 19/216938 | | 11/2019 |
| WO | WO 19/220436 | | 11/2019 |
| WO | WO 20/006154 | | 1/2020 |
| WO | WO 20/012756 | | 1/2020 |
| WO | WO 20/025696 | | 2/2020 |
| WO | WO 20/034663 | | 2/2020 |
| WO | WO 20/056157 | | 3/2020 |
| WO | WO 20/076356 | | 4/2020 |
| WO | WO 20/097221 | | 5/2020 |
| WO | WO 20/101246 | | 5/2020 |
| WO | WO 20/120050 | | 6/2020 |
| WO | WO 20/121973 | | 6/2020 |
| WO | WO 20/131140 | | 6/2020 |
| WO | WO 20/139181 | | 7/2020 |
| WO | WO 20/139355 | | 7/2020 |
| WO | WO 20/139357 | | 7/2020 |
| WO | WO 20/142193 | | 7/2020 |
| WO | WO 20/146445 | | 7/2020 |
| WO | WO 20/151329 | | 7/2020 |
| WO | WO 20/157761 | | 8/2020 |
| WO | WO 20/163455 | | 8/2020 |
| WO | WO 20/167667 | | 8/2020 |
| WO | WO 20/174262 | | 9/2020 |
| WO | WO 20/177583 | | 9/2020 |
| WO | WO 20/185233 | | 9/2020 |
| WO | WO 20/185234 | | 9/2020 |
| WO | WO 20/195658 | | 10/2020 |
| WO | WO 20/198189 | | 10/2020 |
| WO | WO 20/198779 | | 10/2020 |
| WO | WO 20/205597 | | 10/2020 |
| WO | WO 20/221200 | | 11/2020 |
| WO | WO 20/240284 | | 12/2020 |
| WO | WO 20/260020 | | 12/2020 |
| WO | WO 20/264010 | | 12/2020 |

\* cited by examiner

OPTIMIZING NEURAL NETWORK STRUCTURES FOR EMBEDDED SYSTEMS

CROSS-REFERENCE TO RELATED APPLICATIONS

This application claims the benefit of U.S. Provisional Application No. 62/703,837, filed Jul. 26, 2018, which is incorporated by reference in its entirety.

STATEMENT REGARDING FEDERALLY SPONSORED RESEARCH OR DEVELOPMENT

This invention was made with government support under SBIR Phase II Grant Award No. 1758546 awarded by the National Science Foundation. The government has certain rights in the invention.

BACKGROUND

This invention relates generally to autonomous control systems for vehicles, and more particularly to the generation and application of machine-learned models used in autonomous control systems for vehicles.

Autonomous control systems are systems that guide vehicles (e.g., automobiles, trucks, vans) without direct guidance by human operators. Autonomous control systems analyze the surrounding physical environment in various ways to guide vehicles in a safe manner. For example, an autonomous control system may detect and/or track objects in the physical environment, and responsive to a detected object, guide the vehicle away from the object such that collision with the object can be avoided. As another example, an autonomous control system may detect boundaries of lanes on the road such that the vehicle can be guided within the appropriate lane with the flow of traffic.

Often times, autonomous control systems use computer models to perform algorithms for analyzing the surrounding environment and performing detection and control operations. For example, the autonomous control system uses a computer model to detect pedestrians on the street using images captured using an onboard camera. The computer models are trained from data sets containing information that resemble potential environments the autonomous control system would encounter during operation. However, training the models is a time-consuming task, sometimes requiring multiple days to complete. Furthermore, when generating a model for use in a new platform, a designer of the model may want to explore multiple different architectures, or multiple different configurations of the same architecture.

SUMMARY OF THE INVENTION

A model training and implementation pipeline trains models for individual embedded systems by generating an intermediate representation of a model for interpretation on the embedded system. The pipeline includes a model generation stage and a model performance estimation stage. The pipeline iterates through multiple models and estimates the performance of the models to determine if the models are able to be applied by the target platform. The models are generated based on the performance of models generated during previous iterations. For example, if the pipeline determines that a model cannot be applied by the target platform with a desired performance, the pipeline generates a new model with a reduced complexity. During the model generation stage, the pipeline translates the description of the model together with the model parameters into an intermediate representation in a language that is compatible with a virtual machine. The intermediate representation is agnostic or independent to the configuration of the target platform. That is, as long as a virtual machine is designed for a platform, the platform is able to apply the model by executing the intermediate representation of the model through the virtual machine. The intermediate representation specifies a set of operations and the order in which the operations are to be performed. The intermediate representation may be a graph representation where nodes in the graph correspond to variables used by the model and the branches connecting the nodes represent operations to be performed on the variables.

To generate the intermediate representation, a graph representation of the model is generated and information about the variables used by the model is propagated through the graph representation. Using the graph representation, the memory utilization of the model graph is estimated and the operations of the model graph are optimized. Furthermore, the data allocation for the variables used by the model and the operations performed by the model are scheduled.

During the model performance estimation stage, the pipeline evaluates the performance of the models without training the models. For instance, the model is generated using default or randomized parameters. Based on the analysis of the performance of the untrained models, a subset of models that perform within the specified performance are selected. The selected models are then trained and the performance of the trained models are analyzed. In some embodiments, different performance parameters are tested after the models have been trained. For example, the trained models are evaluated based on their accuracy in addition to their performance characteristics. That is, if models for identifying road hazards is being tested, the accuracy of the models for detecting various road hazards in test images.

Based on the analysis of the performance of the trained models, a single model is selected for deployment to the target platform. The intermediate representation of the trained model is then stored in the storage medium of the target system together with a set of kernels for implementing the model and a virtual machine for compiling and executing the model using the set of kernels. The virtual machine is a software module that enables a computer to run or execute programs that are written in the language of the intermediate representation. The virtual machine translates the intermediate representation that is written in the intermediate language into the machine code of the processor included in the computer by selecting and applying kernels to implement the intermediate representation.

Figure 1A:
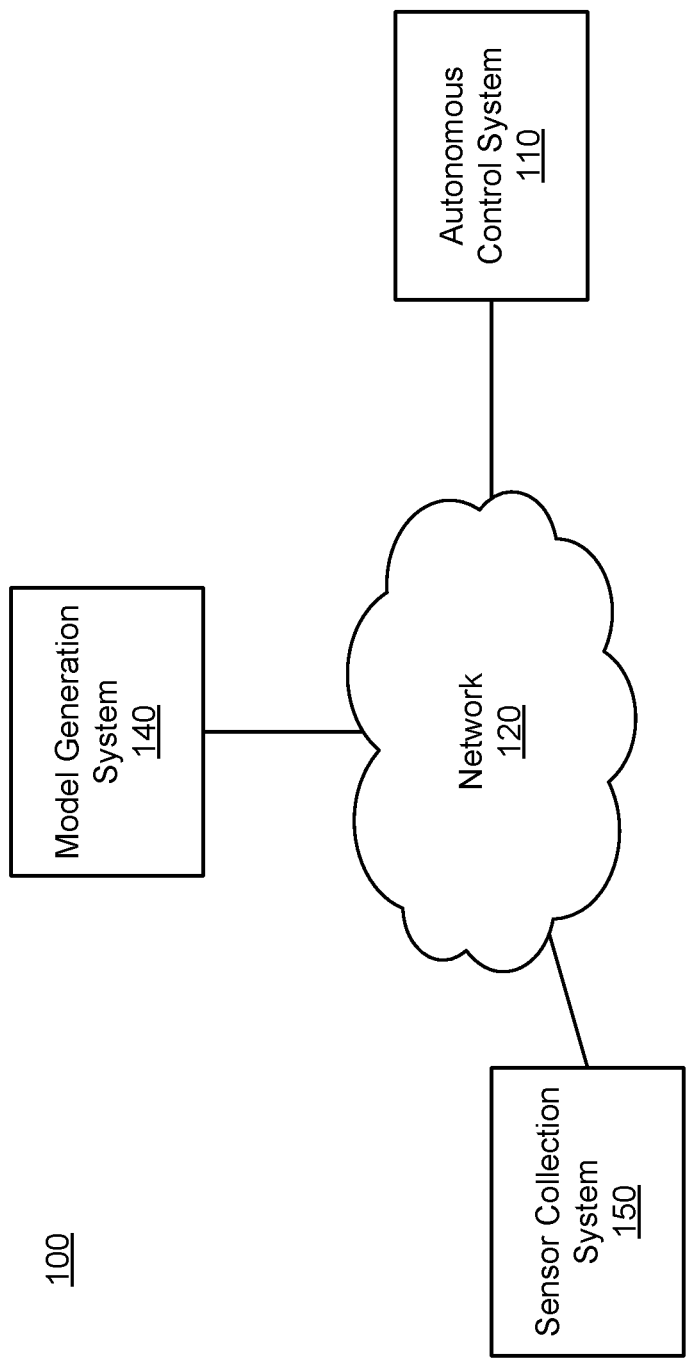
FIG. 1A is an example network environment for autonomous control, in accordance with an embodiment

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION OF THE PREFERRED EMBODIMENT

FIG. 1 is an example network environment 100 for autonomous control, in accordance with an embodiment. The network environment 100 includes an autonomous control system 110, a sensor collection system 150, and a model generation system 140 coupled to a network 120.

The autonomous control system 110 guides vehicles based on information related to the surrounding environment received from the one or more sensors attached to the vehicles. The vehicles are any means of conveyance or transport in or by which someone or something can travel from one place to another, and may include automobiles, trucks, vans, robotic transports, and the like. The autonomous control system 110 may guide a vehicle through one or more trips from one destination to another. For example, the autonomous control system 110 may guide a ride-sharing vehicle (e.g., a taxi) from a passenger's point of pick-up to their desired destination. Though described herein as an autonomous vehicle, the control decisions of the autonomous controls system may provide semi-autonomous control rather than complete control of the vehicle, for example to supplement or override user control, or as primary means of control that can be overridden by a user. In addition, although the autonomous control system 110 is described herein as a system that guides vehicles, the autonomous control system 110 may also guide other systems such as robotic arms or manufacturing equipment.

One or more sensors are attached to the vehicles to gather information used to generate the control of the vehicle. The sensors are devices that detect information related to the physical environment. The information can be captured through many forms. For example, the sensors may be imaging sensors that capture scenes of the physical environment through a series of one or more images. In such an example, other vehicles proximate to the vehicle of the autonomous control system, stationary and moving objects such as trees, fire hydrants, lamp posts, and the like may be captured in the images. As another example, the sensors may be geo-locational sensors, and more specifically global positioning system (GPS) sensors that detect the position of the sensor (and its attached vehicle) relative to a map of the physical environment. As yet another example, the sensors may be microphones that detect sounds in the environment in the form of audio signals. As defined herein, sensor data of a sensor denotes the readings of the environment collected by the sensor that characterize how the sensor perceives the environment.

The one or more sensors may include high-capacity sensors that have certain improved characteristics over other sensors. For example, high-capacity imaging sensors may generate sensor data having improved characteristics, such as increased resolution, data collection time, sharpness, field-of-view, and the like, compared to other sensors. As another example, high-capacity geo-locational sensors may pinpoint the location of the sensor more accurately than others. As another example, some high-capacity sensors are able to detect information at a level of accuracy or precision that other sensors cannot. For example, light detection and ranging (LIDAR) sensors can measure the distance from the sensor to an object at a level of accuracy that is difficult to achieve for image sensors. Alternatively, more-sophisticated LIDAR sensors may generate greater precision data than less-sophisticated LIDAR sensors. In general, high-capacity sensors tend to be complex, expensive, and bulky. Moreover, it may be difficult for an owner (or a manufacturer) of a vehicle to purchase and install high-capacity sensors separately on his or her vehicle.

On the other hand, due to their high capacity, only a few or even a single high-capacity sensor may be needed to collect a substantial amount of information on the physical environment for accurate performance of the autonomous control system 110. For example, a single LIDAR sensor on a vehicle can capture a 360-degree field-of-view of the physical environment through high-resolution signals that may be alone sufficient for accurate performance of the autonomous control system 110.

The one or more sensors may also include replacement sensors that have smaller capacity than high-capacity sensors, but may be more readily available than high-capacity sensors in that they are portable, easier to install, and relatively inexpensive. For example, many vehicles are now manufactured with sensors at the front and/or back of the car that provide real-time sensor data of the surroundings such that the operator can detect objects to avoid collisions with the object. However, these sensors have limited field-of-view that captures only a portion of the environment at the front and/or back of the vehicle. As another example, portable radio detection and ranging (RADAR) sensors may be able to detect distance of objects better than imaging sensors, but still may not have the accuracy of a high-capacity LIDAR sensor. As another example, portable cameras are easy to install on windshield or dashboard areas of the vehicle, but may lack the resolution and field-of-view of LIDAR sensors.

In contrast to high-capacity sensors, each sensor in a set of replacement sensors may provide fragments of information on the surrounding environment in different formats of sensor data and have lower precision information. However, the combination of sensor data may contain information comparable to that generated from high-capacity sensors. For example, a vehicle may have an RGB camera with a first resolution at the back of a vehicle, a greyscale camera with a second resolution at the dashboard of the vehicle, another RGB camera with a third resolution at the left and right sides of the vehicle, and a portable RADAR sensor. Individually, each camera has a fragmented field-of-view limited to one among the front, back, and sides of the vehicle in different resolutions and color, and the portable RADAR sensor has sub-optimal distance measurements (with respect to the high-capacity sensors).

The autonomous control system 110 performs various detection and control algorithms based on sensor data of the physical environment to guide the vehicles in a safe and efficient manner. For example, the autonomous control system 110 may detect various objects (e.g., lamp post, cars) that are proximate to a vehicle in the captured sensor data of the environment, and guide the vehicle away from the objects to prevent collision of the vehicle with the objects. As another example, the autonomous control system 110 may detect boundaries of lanes on the road such that the vehicle can be guided within the appropriate lane with the flow of traffic.

In one embodiment, various functions of the autonomous control system 110 are performed through machine-learned computer models. In one embodiment, the machine-learned models are neural network models such as feed-forward networks, convolutional neural networks (CNN), deep neural networks (DNN), recurrent neural networks (RNN), self-organizing maps (SOM), and the like, that are generated and trained by the model generation system 140 based on training data sets.

The model generation system 140 constructs and trains machine-learned models based on sensor information provided by the sensor collection system 150. The trained machine-learned models perform various functions, such as simulating sensor data, estimating sensor quality, and other detection and control algorithms for use by the autonomous control system 110. The model generation system 140 trains the models based on training data sets. The training data sets contain information resembling potential environments the autonomous control system 110 would encounter during operation. For example, a computer model for detecting pedestrians on the street may learn different representations of people from a data set containing various images of pedestrians. A sufficient amount of training data generally leads to improved performance of computer models. However, gathering training data can be costly and time-consuming. Moreover, some characteristics of environments that are important for the computer models to learn may not be included in existing training data.

The sensor collection system 150 is attached to one or more data collection vehicles, and includes one or more sensors. The sensor collection system 150 collects training information related to the physical environment using the various sensors, such that relationships can be learned between sensor data from the different sensors available to the sensor collection system and the sensor data may be used to learn appropriate interpretation of the environment or for control of the vehicle.

The one or more sensors of the sensor collection system 150 can include active sensors and passive sensors. A passive sensor observes the environment. Passive sensors can include cameras, or microphones, vibration sensors, and the like. Passive sensors include a receiver that detects and measures various forms of energy that are naturally emitted from the physical environment or constituents of the physical environment across various locations of the environment. As an example, when the sensor is a camera, the sensor data is a time series of pixel data indicating intensities of detected light. That is, a time series of pictures is acquired. Each picture is divided into pixels and each pixel may have one or more intensity values associated with it depending on whether the camera is a greyscale camera or a color camera. For example, when the camera is a color camera describing a color of a pixel in red, green, and blue, the intensity value for each is typically an integer, such as an 8, 10, or 12-bit integer specifying the intensity of the red, green, or blue portion of the frequency. If the resolution of the picture were 100×100 pixels (having 10,000 total pixels), for every picture, there would be 3 separate channels of 10,000 pixels.

When the sensor is a microphone, the sensor data is a time series of air pressure values. In one embodiment, the time series of air pressure values is converted into a spectrogram. A spectrogram shows a time series of components (strengths) showing a collection of frequency strengths for each time period. The spectrogram is generated from the initial sound waves by a time windowed discrete Fourier transform, also sometimes called a "Gabor Transform." The size of the sensor data can be adjusted by adjusting the number of frequencies and/or the size of the time step, used in the windowed Fourier transform.

When the sensor is a vibration sensor, the sensor data is a time series of physical displacements of the vibration sensor in the system. The vibration sensor is typically attached or near to a particular component of the system to represent vibration of that component. Similarly to the microphone, in one embodiment, the time series of physical displacements are converted into a spectrogram, and the number of frequencies used in the Fourier transform can be adjusted.

The one or more sensors may include active sensors. Active sensors emit energy and then measure the energy that is reflected back to one or more receivers in the sensor. The reflected energy allows active sensors to probe for environmental information that may not otherwise be readily detected passively at the sensor. For example, active sensors may estimate distances of objects from the sensor better than passive sensors. Active sensors include both a transmitter and receiver of energy, in contrast to passive sensors that use receivers. Active sensors can include ultrasound sensors, RADAR sensors, active infrared (IR) sensors, LIDAR sensors, and the like. Usually, ultrasound sensors emit ultrasound waves, RADAR sensors emit microwaves, LIDAR sensors emit laser pulses in the near-IR or visible range waves, and IR sensors emit IR waves.

In one instance, the sensor data includes depth measurements that measures how far away an object is from the sensor. Specifically, the depth is measured by triggering a timer when the energy is emitted, and detecting the amount of time needed for the receiver to detect the reflected energy. The traveling speed of the energy can be used to calculate the depth of objects at various locations in the environment by emitting energy signals in the direction of the objects. In another instance, the sensor data also includes intensity measurements that measures the intensity of the reflected energy detected at the receiver of the sensor. These intensity values may be represented as 8 or 16-bit integer values.

For many types of active sensors, the sensor data is a collection of data points with reference to the sensor in a three-dimensional (3D) coordinate system ("point cloud" measurements) such as, for example, a spherical coordinate system or a Cartesian coordinate system. Each value designates the measurement of the actively-transmitted signal at the receiver (e.g., depth or reflected intensity). The number of data points in the point cloud is related to the resolution of the sensor. Further, even for a given sensor, the number of data points varies depending on factors such as what portion of the environment is within the sensor's range.

For example, when the sensor is a LIDAR sensor, the sensor data may include a point cloud of intensity measurements and a point cloud of reflectance measurements. Specifically, a narrow beam laser is pointed in a specific, known direction. This known direction can be identified as a pair of angles including a polar angle θ and an azimuth angle φ with reference to the sensor. The polar angle θ specifies from the upward direction (0 degrees) to the downward direction (180 degrees), while the azimuth angle φ specifies from the forward direction (0 degrees) to the backward direction (360 degrees).

By actively emitting energy across the entire field-of-view, a set of measurements for depth and/or intensity can be collected for different values of (r, θ, φ), where r denotes the depth measurement of an object (e.g., ground, cars, trees) to the sensor and θ, φ together denote the known direction object. Thus, a 3D view of the environment can be mapped to a point cloud representing objects in the environment by using the returned depth and intensity thereof.

In one embodiment, point cloud measurements are collected with rotational scanning. For example, multiple laser beams (e.g. 64 laser beams) can be emitted from a rotating drum, enabling multiple measurements across various values of θ. In this case, θ and φ are pre-determined by the position of the rotating drum and which of the multiple beams emitted the light, while r is measured based on the time-of-flight of the energy beam as discussed above.

In another embodiment, the point cloud measurements are collected by linear scanning in the (x,y) space. In such implementations, the light source is aimed at one or more mirrors. The mirrors, which may be microscopic mirrors (e.g. MEMS mirrors), can be manipulated programmatically, causing the energy beam to be steered. While mirror-based steering could potentially implement almost any scanning pattern, in practice these systems are usually used to implement grid-like scanning patterns that follow the Cartesian coordinate system.

In yet another embodiment, the point cloud measurements are collected through a phased array. A phased array is typically implemented with no moving parts. Instead, a phased array is made up of multiple transmitters at the same frequency but with different phase delay. A beam-like radiation pattern is achieved by the constructive and destructive interference of these multiple beams. The results of this approach can be viewed in polar coordinates or Cartesian coordinates.

Active sensors such as RADAR and LIDAR may output sparse representations of the environment. This sparsity can arise for a few reasons. For example, most active sensors have a minimum and maximum range at which they can reliably receive a returned signal. For example, a LIDAR sensor specifies a minimum usable return range of 0.9 meters and a maximum usable return range of 120 meters. When objects and the ground plane are outside of this range, no return is received, and therefore the returns comprise a sparse point cloud. As another example, even when objects are within range, occlusions such as rain or fog can lead to diffraction of a LIDAR sensor's laser beams. This can lead to fewer returns, which can cause the point cloud to be sparser compared to the point clouds that are generated in dry weather.

Figure 1B:
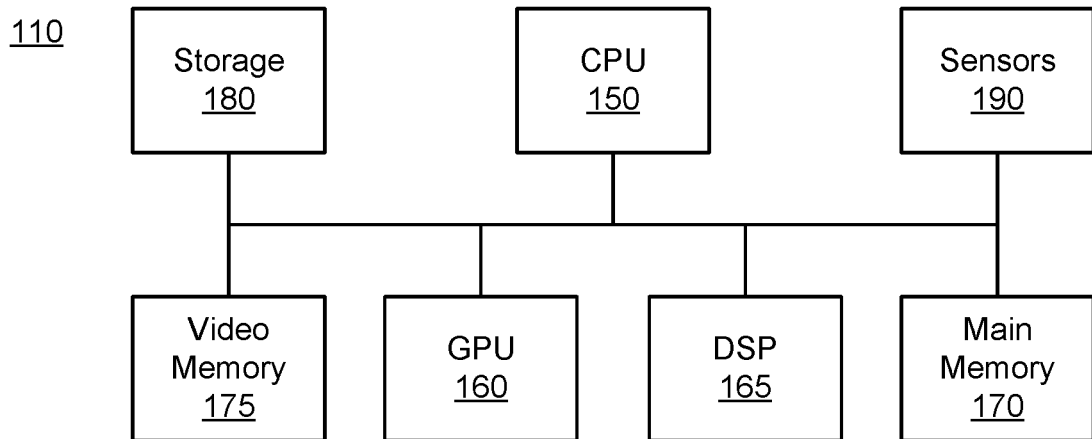
FIGS. 1B-1D are example computer architectures for using in the autonomous control system, in accordance with an embodiment.
Figure 1C:
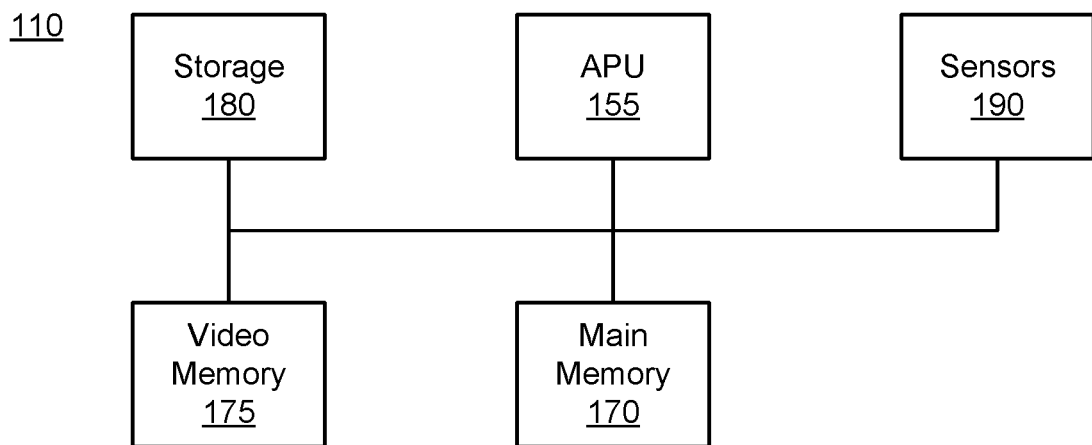
Figure 1D:
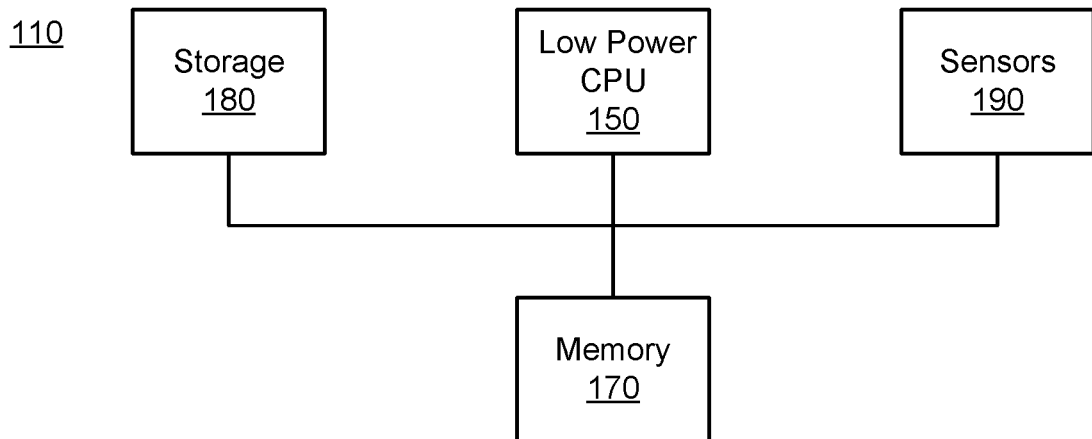

FIGS. 1B-1D are example computer architectures for using in the autonomous control system, in accordance with an embodiment. FIG. 1B is an example computer architecture that includes a central processing unit (CPU) 150, a graphics processing unit (GPU) 160, a digital signal processor (DSP) 165, main memory 170, video memory 175, storage 180, and sensors 190. The CPU 150 is an electronic circuit that performs arithmetic, logical, control, and input/output operations as specified by instructions loaded into main memory 170. The CPU 150 may, for example, be an x86 based processor, and x64 based processor, or an ARM based processor. The CPU has an instruction set that is used to instruct the CPU on performing specific operations to data stored in registers. In some embodiments, the CPU includes multiple cores (e.g., 4 cores), each core capable of executing the entire instruction set of the CPU.

The GPU 160 is a specialized electronic circuit designed to efficiently perform specific operations or mathematical functions. GPU 160 is designed to perform highly parallel operations such as matrix or vector operations. Furthermore, GPU 160 may be designed to more-effectively perform parallel floating point operations. The GPU 160 typically has a larger number of compute units than the CPU 150. The GPU has more compute units than the number of cores of the CPU, but each GPU is not capable of performing every operation a CPU core is capable of performing. For example, a GPU that has 100 cores is capable of multiplying a scalar value to each element of a 10 by 10 matrix in a single cycle, whereas a dual core CPU may perform the same computation in 50 or more cycles.

The DSP 165 is a specialized electronic circuit that is optimized for performing operations used in digital signal processing. In some embodiments, the DSP includes a vector floating point co-processor for performing vector operations more efficiently than a CPU.

The main memory 170 stores a series of instructions to be executed by the CPU or the GPU. The main memory further stores data to be used by the CPU. For example, the main memory includes a segment for storing the result of calculations performed by the CPU. The video memory 175 stores information to be used by the GPU. In some embodiments, since the GPU may perform certain complex calculations faster than the CPU, the video memory is faster at loading and storing data than the main memory. In one embodiment, the system may combine both the main memory and the video memory in a single unit. As such, both the CPU and the GPU may share the same memory module for storing the data use the respective processors. The main memory and the video memory may be implemented as a dynamic random-access memory (DRAM), such as the double data rate synchronous DRAM (DDR SDRAM).

The storage 180 stores persistent data to be kept between power cycles of the autonomous control system. For example, storage 180 stores the program to be executed by the autonomous control system and the settings/parameters used by the autonomous control system. The storage 180 may be implemented as a hard disk drive (HDD) or a solid state drive (SSD).

FIG. 1C is an example computer architecture that includes an accelerated processing unit (APU) 155, main memory 170, video memory 175, storage 180, and sensors 190. That is, the example of FIG. 1C includes an APU instead of a discrete CPU and a discrete GPU. The APU 155 includes CPU cores and GPU compute units in a single die or chip. In some embodiments, the APU includes separate dies for the CPU and GPU connected together via an interposer.

FIG. 1D is an example computer architecture that includes a low power CPU 150, memory 170, storage 180, and sensors 190. That is, the example of FIG. 1D includes a single memory module instead of dedicated main and video memory. Furthermore, the example of FIG. 1D only includes a low power CPU and does not include a GPU.

Different architectures and different computer configurations within a same architecture may have different capabilities. For example, an architecture that includes a GPU is capable of performing matrix operations mode efficiently than an architecture that does not include a GPU. Furthermore, an architecture that uses 8 GB of memory allocation compared to an architecture that uses 4 GB of memory allocation is capable of including more data in memory and thus may use more complex data structures. Further, a model that uses 32 GB of memory bandwidth is able to access more model parameters and/or temporary variables than a model that uses 16 GB of memory bandwidth. As such, a model that operates with a specific performance in a first platform having a first computer configuration, may not operate with acceptable performance in a second platform having a second computer configuration. As such, to deploy models across various platforms, different models are generated that are tailored to the capabilities of the respective platforms.

Figure 2:
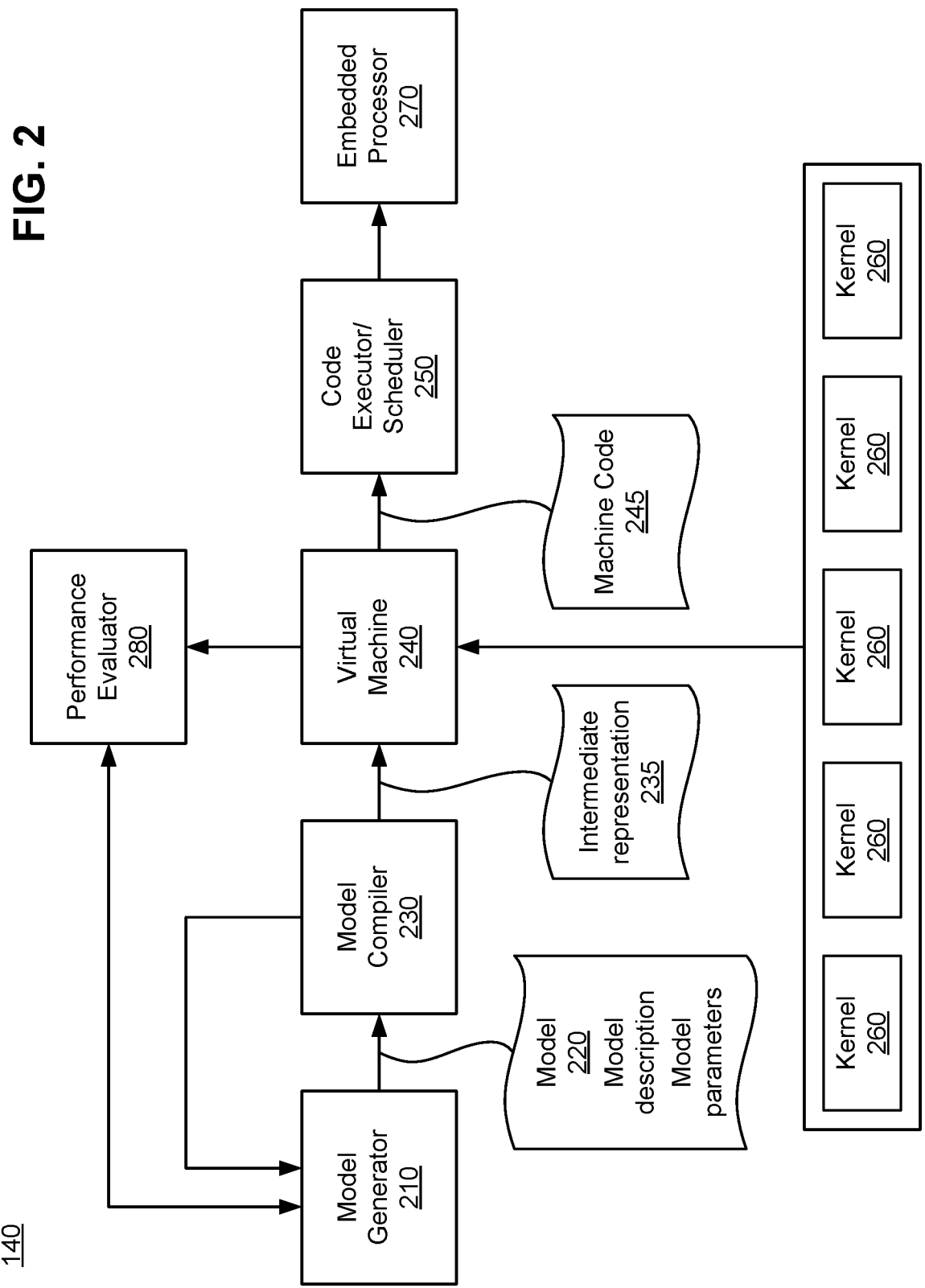
FIG. 2 is flow diagram of a process for generating a machine-learned computer model, in accordance with an embodiment.

FIG. 2 is a block diagram of the model generation system 140 for generating a machine-learned computer model, in accordance with an embodiment. The model generation system is used to select and train models for deployment to a variety of different embedded processors like the ones showed in FIGS. 1B-1D. The system includes a model generator 210, a model compiler 230, a virtual machine 240, a code executor/scheduler 250, and an embedded processor 270, and a performance evaluator 280. In general, using an iterative process, a computer model is generated based on a performance of a model generated in previous iterations of the process. To determine the performance of the model, the model is converted to an intermediate representation 235 that can be interpreted by the virtual machine 240. Using the intermediate representation, the virtual machine 240 generates machine code 245 for executing the operations for applying the model. The performance evaluator 280 then analyzes the intermediate representation and the generated machine code to estimate or measure the performance of the model as performed by the target system.

The model generator 210 generates machine-learned models based on an input from the model compiler 230 and the performance evaluator 280. The model 220 generated by the model generator 210 includes a model description and a set of model parameters. In some embodiments, the model generator 210 generates an initial default model and modifies the model based on information received form the model compiler 230 and the performance evaluator 280. For instance, the model generator may modify the model to have a fewer number of layers if the performance evaluator 280 indicates that the model uses an amount of memory that is larger than the available memory in the target platform. In another example, the model generator 210 may increase the complexity of the model if the performance evaluator 280 indicates that an estimated frame rate of the model is higher than 60 frames per second.

The model compiler 230 receives the model 220 generated by the model generator 210 and generates an intermediate representation 235 of the model. The intermediate interpretation is a platform agnostic representation of the operations to be performed for using the model 220. The model compiler 230 translates the model description and model parameters into a set of operations that are compatible with the virtual machine 240. A detailed description of the model compiler 230 is described below in conjunction with FIG. 3.

The virtual machine 240 receives the intermediate interpretation 235 that includes platform agnostic operations and generates machine code 245 that includes platform specific instructions for running the set of operations described in the intermediate representation 235. The virtual machine identifies an operation specified in the intermediate representation 235 and selects a kernel 260 that implements the operation. In some embodiments, the kernels 260 are pieces of code implemented in the assembly language of the embedded processor 270 of the platform for which the model is being built. A detailed description of the virtual machine 240 is described below in conjunction with FIG. 4.

The code executor 250 instructs the processor 270 to execute the instructions included in machine code 245. The embedded processor 270 may be a CPU, a GPU, a digital signal processor (DSP), or another domain-specific processor, or a combination thereof. In some embodiments, the code executor 250 manages the hardware resources such as memory allocation and instruction execution scheduling. In some embodiments, the code executor 250 is part of the operating system of the platform using the model.

The performance evaluator 280 estimates the performance of the model generated by the model generator 210. The performance evaluator 280 estimates the performance based on the model description and model parameters provided by the model generator 210. In some embodiments, the performance evaluator 280 mathematically estimates the performance of the model using mathematics. For example, a matrix-multiplication with an input matrices of size N×N utilizes $O(N^3)$ floating point operations and $O(N^2)$ memory accesses.

The performance evaluator 280 additionally measures the performance of the model based on the output of the virtual machine 240. The performance evaluator 280 empirically measures the performance of the model by profiling the machine code 245.

In some embodiments, performance evaluator 280 determines a latency in completing the operations of the model, a throughput or frame rate at which the operations of the model can be finished, an amount of power used by the target system implementing the model, and an amount of resources (e.g., memory and processor usage) consumed by the target system implementing the model.

The performance estimator determines the throughout by determines a number of times per second the model can be applied by a target system. In some embodiments, the performance evaluator 280 determines if the operations of the model can be performed 60 times per second by the target embedded processor 270. In some embodiments, the performance evaluator 280 determines a number of operations to be performed and compares the determined number of operations to a maximum number of operations per second the embedded processor 270 is capable of performing. For instance, the performance evaluator 280 determines that a GPU has 1.8 TFLOPS (or $1.8 \times 10^{12}$ floating point operations per second) of computing capability, and the model is performed using $20 \times 10^9$ floating point operations. As such, the model is capable of being performed at a 90 frames per second (FPS) rate. In yet another example, the performance evaluator 280 instructs the embedded processor to execute the operations implementing the model and empirically measures a frame rate at which the processor completes the operations implementing the model.

The performance evaluator 280 empirically determines a latency as the amount of time used by a target system to complete the execution of the model. The latency may not be directly correlated with the throughput of the model as the execution of the model may be overlapped. That is, a next execution of the model may be started before a previous execution of the model is finished.

The performance evaluator 280 maththematically determines a number of naïve floating point operations (FLOPS) the total number of FLOPS used by the model when implemented with default kernels. The naïve FLOPS are estimated using the model description and model parameters generated by the model generator.

The performance evaluator 280 uses static analysis to determine a number of optimized FLOPS as the number of FLOPS used by the model based on the machine code 245 generated by the virtual machine 240.

The performance evaluator 280 mathematically determines a naïve memory allocation as the total memory used by the model for all the model-parameters and temporary variables. The naïve memory allocation is estimated based on the model 220 as generated by the model generator 210.

The performance evaluator 280 determines an optimized memory allocation as the amount of memory used by the model after the allocation of the model-parameters and temporary variables have been scheduled. The optimized memory allocation is measured based on the intermediate representation 235 generated by the model compiler 230. In other embodiments, the optimized memory allocation is measured based on the machine code 245 generated by the virtual machine 240. The optimized memory allocation is lower than the naïve memory allocation, for example, when the memory to store temporary variables are re-allocated once the temporary variables are no longer needed.

The performance evaluator 280 mathematically determines a naïve memory bandwidth as the total memory bandwidth used by the model for all the model-parameters and temporary variables. The naïve memory bandwidth is estimated based on the model 220 as generated by the model generator 210.

The performance evaluator 280 empirically determines an optimized memory bandwidth as the memory bandwidth used by the model after the allocation of the model-parameters and temporary variables, as well as the operations executed by the model, have been scheduled. The optimized memory bandwidth is measured based on the machine code 245 generated by the virtual machine 240. The optimized memory bandwidth is lower than the naïve memory bandwidth, for example, when operations to be performed by the model are fused.

FIG. 3 is a block diagram of the model compiler, in accordance with an embodiment. The model compiler includes a graph parser 310, a memory estimator 320, a graph optimizer 330, a tensor scheduler 340, and an operation scheduler 350.

The graph parser 310 maps the computations of the model 220 to a model graph that includes information about the operations to be performed when using the model. In some embodiments, the model graph is a tree structure that includes nodes corresponding to the data used by the model and branches specifying the operations applied to the nodes.

The memory estimator 320 determines an amount of memory used for storing the data used in the model graph. The memory estimator determines an amount of memory used by each of the nodes of the model graph based on the data shape and data type of the leaf nodes and the operations performed on each of the nodes. For example, if a first node has a 224×224×3 shape and a float32 type, and a second node has a 224×224×3 shape and a float32 type, the memory estimator 320 would determine that a third node corresponding to the concatenation of the first and second node has a 224×224×6 shape and a float32 type. As used herein, the shape of the node represents the dimensionality of the node and the size of the node in each of the dimensions. That is, the shape of the node is the n-dimensional shape (e.g., n-dimensional parallelotope). As such a 224×224×3 shape represents a matrix with 224 elements in a first dimension, 224 elements in a second dimension, and 3 elements in a third dimension. In some embodiments, the memory estimator 320 propagates the data shape and type from the leaf nodes of model graph through each of the branches until the memory estimator has determined the data shape and type for every node of the model graph.

Figure 3A:
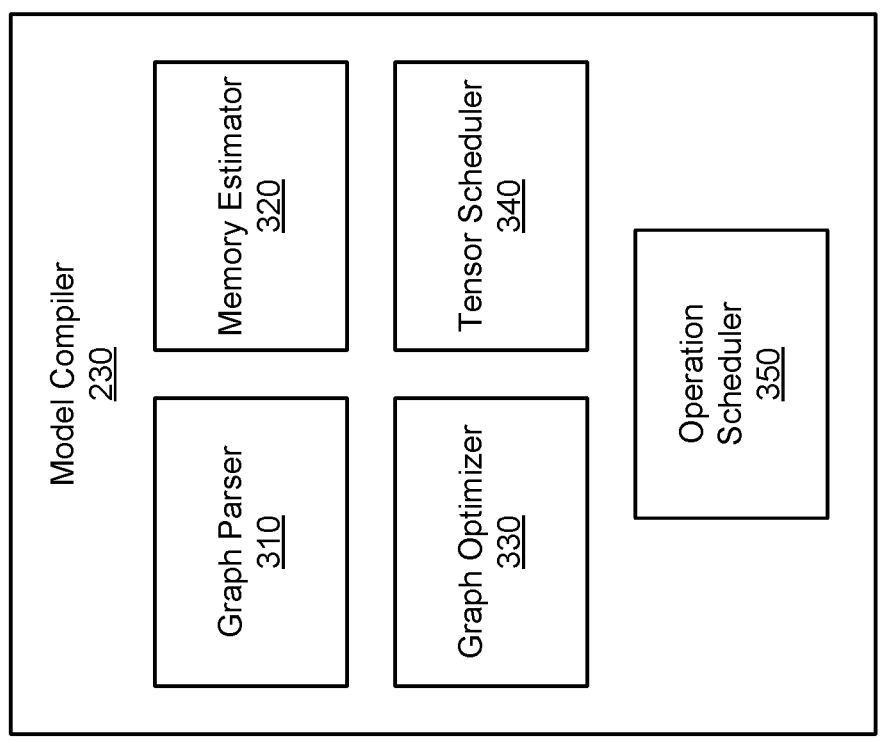
FIG. 3A is a block diagram of the model compiler, in accordance with an embodiment.
Figure 3D:
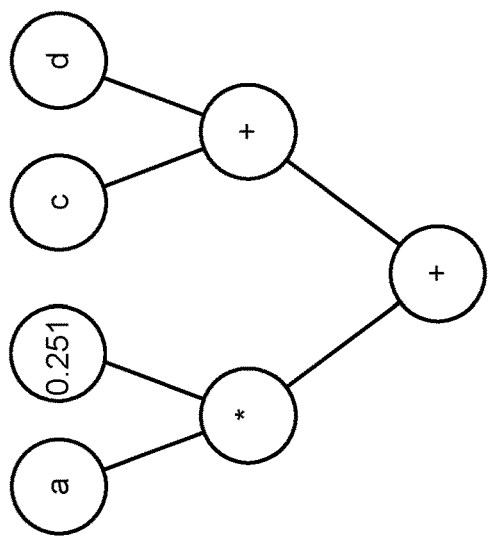
FIGS. 3B-3D illustrate two ways of optimizing a model graph, in accordance with an embodiment.
Figure 3C:
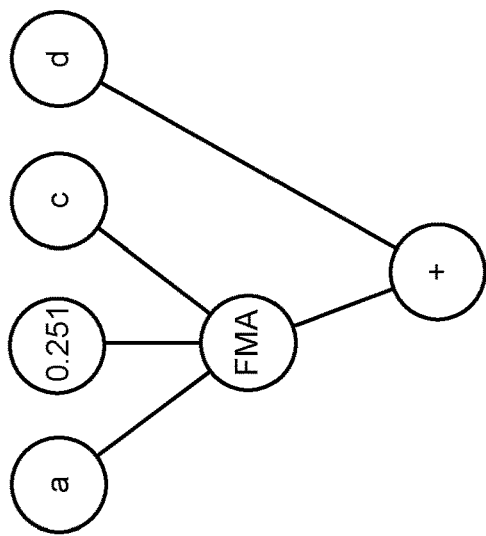
Figure 3B:
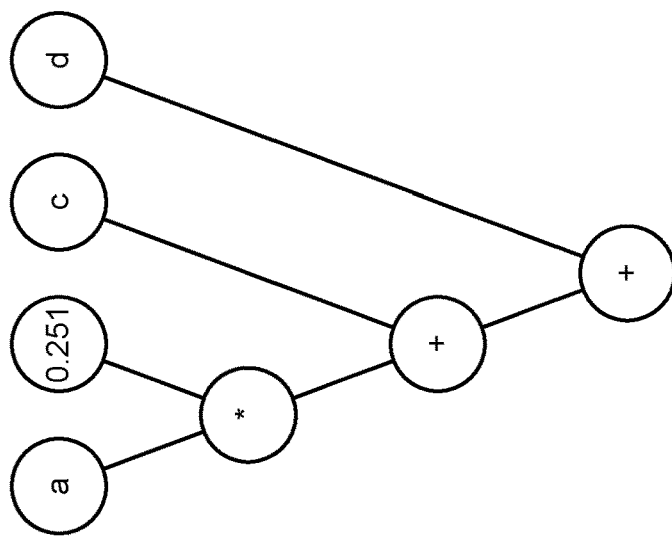

The graph optimizer 330 performs optimizations on the model graph generated by the model parser 310. For example, the graph optimizer 330 may fuse operations that can be performed by a single instruction. For instance, the graph optimizer 330 may fuse a multiplication and an addition operation as a single fused multiply-accumulate (FMA) operation. In another example, the graph optimizer 330 may fuse a batch-normalization layer with a convolution step. FIGS. 3B-3D illustrate two ways of optimizing a model graph. FIG. 3B illustrates a model graph for the operation $$a*0.251+c+d$$

Where a, c, and d are variables used by model. The model graph first multiplies variable a with static value 0.251 adds c to the result of the multiplication, and finally adds d to the result of the addition. FIG. 3C illustrates an optimized model graph where the first two operations are fused into a fused multiple-accumulate (FMA) operation. FIG. 3D illustrates a second optimization where a multiplication operation between a and 0.251 is performed in parallel with an add operation between c and d. As such, the model graphs of FIGS. 3C and 3D are performed in 2 compute cycles instead of 3 compute cycles for the model graph of FIG. 3B.

The tensor scheduler 340 identifies a memory bottleneck in the model graph. Based on the identified bottleneck, the model compiler may determine which operations not to schedule concurrently so as to reduce the amount of memory that is being used concurrently at any given point in time. In some embodiments, the tensor scheduler allocates a portion of the available memory for each of the tensors used by the model 220. In one embodiments, the tensor scheduler 340 receives a maximum amount of memory available in the target platform system. In other embodiments, the tensor scheduler 340 minimizes the amount of memory concurrently used at any given point. For example, the tensor scheduler 340 identifies the memory bottleneck of the model and determines if the operations involved in the memory bottleneck can be split to reduce the amount of memory being used. For example, if the memory bottleneck includes a dot product of a first 100 element vector with a second 100 element vector, the tensor scheduler may split the dot product as a first dot product of two 50 element vectors and a subsequent second dot product of two 50 element vectors, thus reducing the amount of temporary memory used to hold the intermediate results of the dot products. In another example, the memory bottleneck may involve the following operation:

$$t = \sum_{i=0}^{99} a_i \times b_i + \sum_{i=0}^{99} c_i \times d_i$$

The operations may be performed as followed:
for i=0 to 99: $p_i = a_i \times b_i$
for i=0 to 99: $q_i = c_i \times d_i$
$t = \Sigma p_i + \Sigma q_i$ This implementation uses at least 200 additional to store each of the $p_i$ and $q_i$ intermediate results. Instead, to reduce the amount of memory used, the tensor scheduler may perform the calculation as:

for i=0 to 99: $t_i = a_i \times b_i$ $t = \Sigma t_i$ for i=0 to 99: $t_i = c_i \times d_i$ $t = t + \Sigma t_i$ As such, the memory bottleneck may be implemented by using an additional 101 tensors to store the $t_i$ intermediate results. Even if a GPU is able to perform 200 multiplications in parallel, the tensor scheduler 340 may select not to perform the 200 multiplications in parallel, but instead breaking the operations into two 100 parallel multiplications to reduce the amount of memory used. This is optimization is referred to as "working set reduction."

The tensor scheduler 340 further identifies when a tensor is no longer used by the model and reallocates the memory space occupied by the tensors that are no longer used to store new tensors generated by the model. For example, a model may perform the following operation:

$t = (a+b) \times c$

Where a, b, c, and t are tensors. To perform this operation, the compiler determines that the tensors a and b are to be first added and stored as a new result tensor, and the new result tensor is to be multiplied with tensor c. This operation may be performed as:

$t_1 \leftarrow a+b$ $t \leftarrow t_1 \times c$

To perform the above operations, five tensors (a, b, c, $t_1$, and t) are used. The tensor schedule may determine that tensor $t_i$ is no longer used after the operation has been performed. Thus, the tensor scheduler may reallocate the memory space used by tensor $t_i$ to store the result of the multiplication operation as follows:

$t_1 \leftarrow a+b$ $t \leftarrow t_1 \times c$

As such, one less tensor is used to perform the operation, reducing the amount of memory concurrently being used. This optimization performed by the tensor scheduler 340 is referred to as "in-place optimization."

The operation scheduler 350 determines an order for the operations in the model graph. The operation scheduler 350 performs a cost determination to determine a rate of usage of the processor of the target system. In some embodiments, the operation schedule determines a number of operations of each type (e.g., a number of add operations, a number of multiply operations, a number of convolution operations, etc.) at various points in the model graph. Based on the determined number of operations, the operation scheduler 350 determines the order in which to perform those operations.

Figure 4:
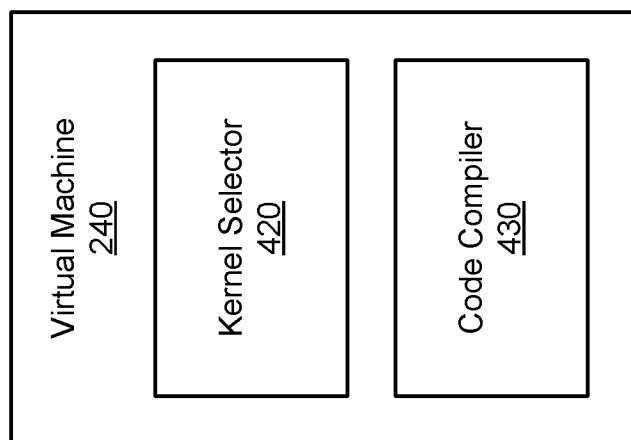
FIG. 4 is a block diagram of the virtual machine, in accordance with an embodiment.

FIG. 4 is a block diagram of the virtual machine, in accordance with an embodiment. The virtual machine 240 includes a kernel selector 420, and a code compiler 430.

The kernel selector 420 identifies a kernel for implementing an operation. As used herein, kernels are implementations of the various operations performed by the virtual machine. The kernels are specifically designed for a platform. In some embodiments, kernels are implemented in the machine language or assembly language of a processor of the target platform. In some embodiments, the kernel selector 420 uses an execution tree that is generated during a startup sequence of the target system based on the kernels available. Multiple kernels may be available for a given operation. For example, multiple kernels, each for performing a different implementation of the convolution operation, is available to the virtual machine 240. In particular, the virtual machine 240 includes one or more kernels for implementing the convolution operation using matrix multiplication, one or more kernels for implementing the convolution operation using a fast Fourier transform, and one or more kernels implementing the convolution operation using integration. In one embodiment, the kernels are grouped by implementation family, each family used for operands with specific characteristics. Moreover, each specific kernel may further includes an indication of a set of characteristics for the operands the kernel is optimized for. For example, a kernel may be optimized for operands with a data type of float32. In another example, a kernel may be optimized for tensors with a shape of 224×224×1. In some embodiments, the kernels additionally include a default kernel for implementing the operation when a specialized kernel is not available.

The kernels 260 may be implemented by software engineers who are domain experts for particular computing platforms. A "kernel" represents a specific implementation of a specific algorithm (e.g. Convolution). The domain expert annotates each kernel with information about which range of inputs that kernel is optimal for. For example, consider the SGEMM operation (Single Precision Floating General Matrix Multiply) which represents multiplying matrix A with a matrix B to produce a matrix C. One kernel for this operation is called "row-major" and another kernel is called "column-major." These two kernels are optimized for the case where the matrix A has each row stored contiguously in memory, and where matrix A has each column stored contiguously in memory. Each of these kernels written by a domain expert, and the domain expert annotates each kernel with information about its preferred input configuration. A kernel is then selected by matching a particular input against each kernel's input configuration. So in the SGEMM case, when an input is stored in a "row-major" format, the "row-major" kernel algorithm is selected.

In another example, multiple kernels for an algorithm can be written that have different tradeoffs between memory bandwidth usage and FLOPs usage. For example, a series of convolutions can be implemented in a "tiled" manner. For the top-left of the image, convolution layers 1, 2, and 3 are performed. Then, the algorithm moves on to performing convolution layers 1, 2, and 3 on the top-right of the image, and so on. This increases cache locality and therefore reduces the memory bandwidth consumed. However, in the border zone between the top-right and top-left of the image, some information needs to be recomputed. As such, this example uses less memory bandwidth but more FLOPs. The tradeoff between FLOPs usage and memory bandwidth usage depends on the particulars of the computing platform on which the software will be executed. Therefore, it is useful to have multiple kernels for each algorithm, and to have a kernel selector that can choose which kernels to use for a specific neural network and a specific computing platform.

Figure 5:
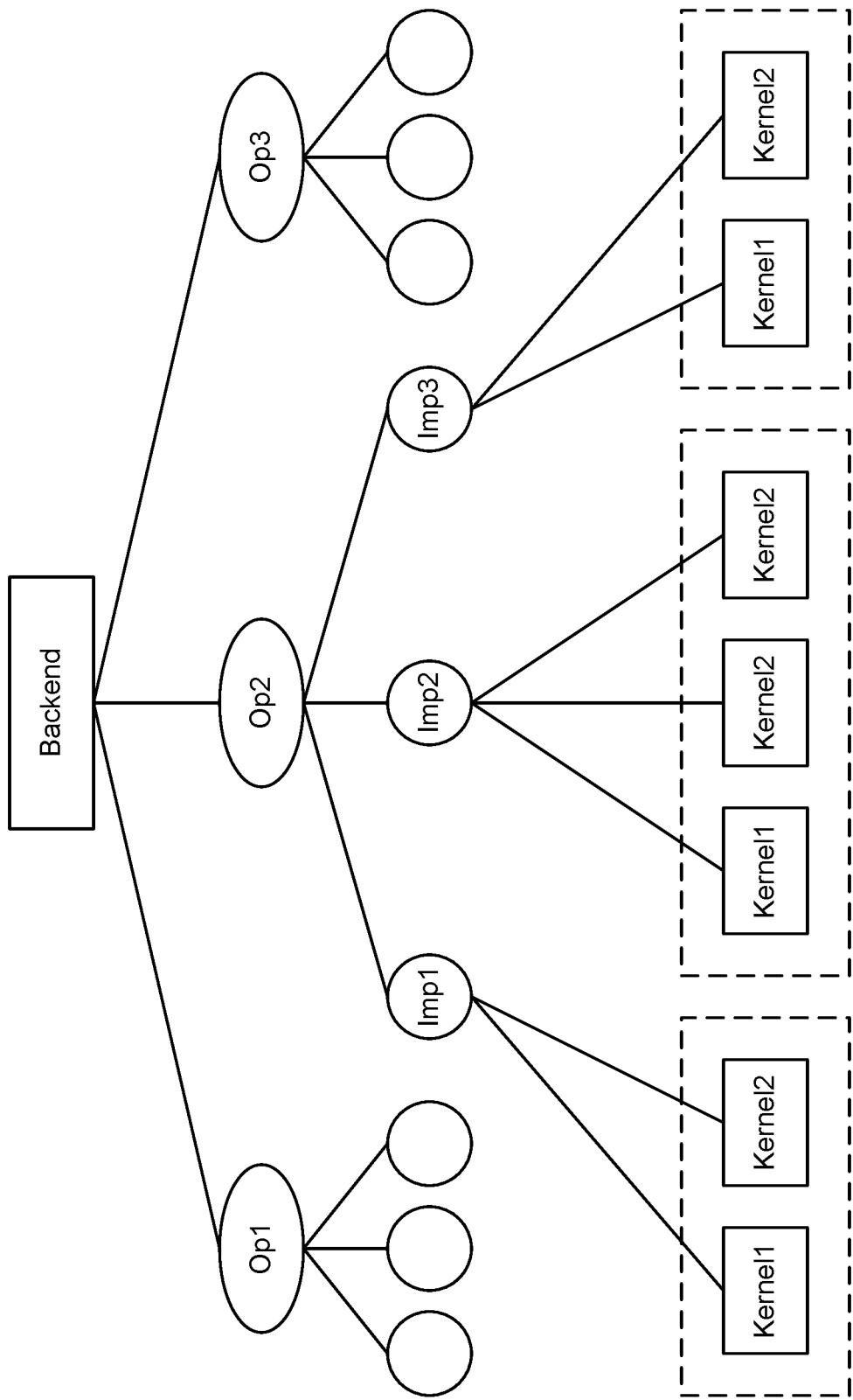
FIG. 5 is a tree representation of the kernels available for a backend device, in accordance with an embodiment.

FIG. 5 is a tree representation of the kernels available for a specific target platform, in accordance with an embodiment. The tree representation of FIG. 5 includes three operations Op1, Op2, and Op3 that are available for the target platform. Within each operation, the target platform includes multiple families implementing the operation. For example, operation Op2 includes three different implementations Imp1, Imp2, and Imp3. Furthermore, each implementation of the operation includes multiple kernels optimized for operands with specific characteristics. For example, implementation Imp2 of operation Op2 includes three different kernels for implementing the operation.

During startup of the system, the kernel selector 420 identifies the available kernels and generates an execution tree based on the information associate with each of the kernels. In some embodiments, the kernel selector 240 first identifies the available implementation families and generates an execution tree to first select an implementation family from the available implementation families, and then to select a kernel within the selected implementation family.

The code compiler 430 generates the machine code for instructing the target system to perform the instructions included in the selected kernels. In some embodiments, the code compiler 430 generates a binary file containing the machine code for executing the operations of the model. In another embodiments, the code compiler 430 temporarily stores the machine instructions for executing the operations of the model in an executable segment of the memory.

Compilation of Machine-Learned Model

Figure 6:
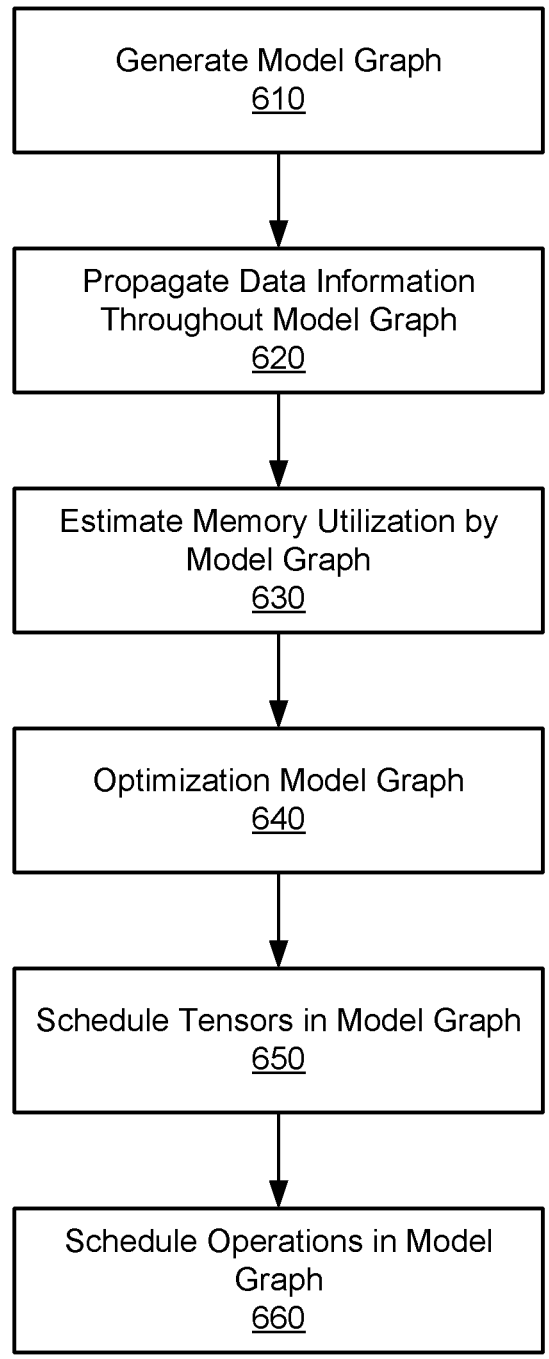
FIG. 6 is a flow diagram of a process for generating an intermediate representation of a machine-learned computer model for being executed by a virtual machine, in accordance with an embodiment.

FIG. 6 is a flow diagram of a process for generating an intermediate representation of a machine-learned computer model for being executed by a virtual machine, in accordance with an embodiment.

The graph parser 310 generates 610 a model graph from the intermediate representation of the model. The model compiler 230 generates the model graph based on the description of the model and the model parameters provided by the model generator 210. The model graph includes multiple nodes representing a data variable connected to each other by branches representing operations on the data variables.

Information about the variables used by the model are propagated 620 through the model graph. In some embodiments, the information about the variables are propagated from the leaf nodes through the model graph based on the operations associated with each of the branches of the model graph. In some embodiments, for each of the nodes for the graph, a data shape and a data type is determined for the data variable associated with the node. Based on the information about the variables used by the model, the amount of memory used by the model is estimated 630.

The graph optimizer 330 optimizes the operations for applying the model. The tensor scheduler 340 identifies the memory bottleneck for the model graph and schedules 650 the tensors used by the model. The operation scheduler 350 schedules 660 the operations of the model graph based on the scheduling of the tensors. In some embodiments, the model compiler 230 performs multiple iterations of the tensor and operation scheduling. That is, after the operations have been scheduled, the scheduling of the tensors may be further modified to improve the performance of the model. In some embodiments, these steps are repeated until scheduling of the tensors and operations do not change between iterations of the scheduling steps.

Execution of Machine-Learned Model

Figure 7:
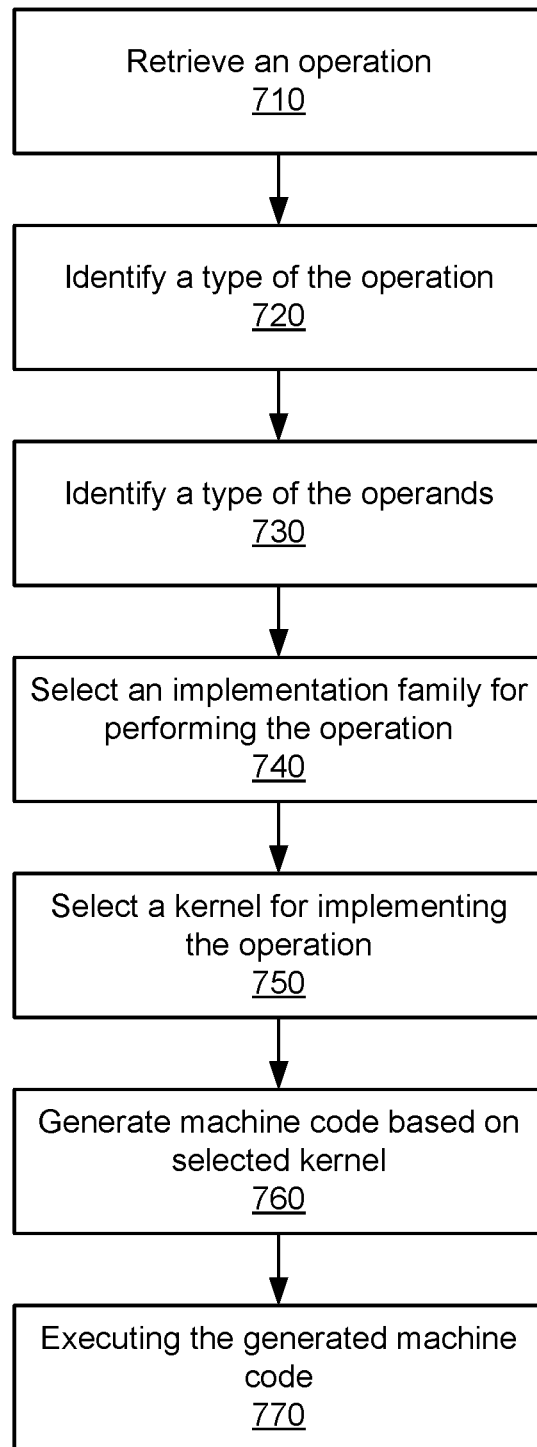
FIG. 7 is a flow diagram of a process for executing intermediate representation of the machine-learned computer model, in accordance with an embodiment.

FIG. 7 is a flow diagram of a process for executing intermediate representation of the machine-learned computer model, in accordance with an embodiment.

An operation is retrieved 710 from the intermedia representation of the model. A type of operation is identified 720 for the retrieved operation. The type and shape of operands are also identified 730 for the retrieved operation.

Based on the identified type of operation and the identified type and shape of the operands of the retrieved operation, an implementation family for performing the retrieved operation is selected. Furthermore, based on the characteristics of the operands, a kernel is selected within the kernels included in the selected implementation family. In some embodiments, an execution tree is traversed to identify the implementation family and the kernel. The execution tree may be generated during startup of the system, or may be pre-generated when the system is built or updated. For example, when a new kernel is deployed to the system, a new execution tree is provided with the new kernel, or the target system is instructed to re-build the execution tree.

Machine code is then generated for instructing a processor to execute the instructions specified by the selected kernel. In some embodiments, the selected kernel is adapted to the shape and type of the operands. The generated machine code is then used for instructing an embedded processor to perform the retrieved operation.

Generation and Selection of Machine-Learned Model

Figure 8:
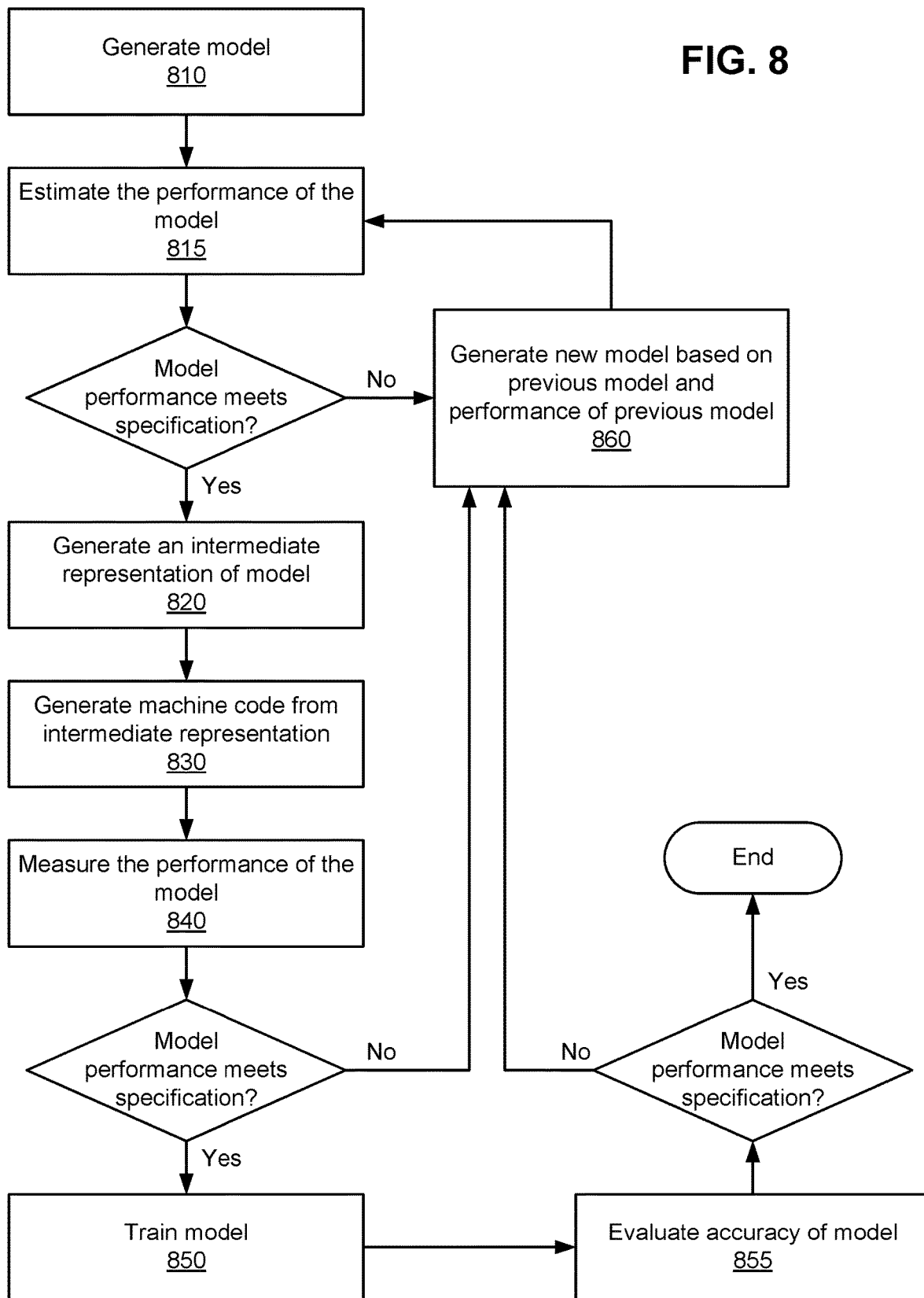
FIG. 8 is a flow diagram of a process for generating and selecting a model architecture, in accordance with an embodiment.

FIG. 8 is a flow diagram of a process for generating and selecting a model architecture, in accordance with an embodiment.

The model generator 210 generates 810 a model. In some embodiments, the model generator 210 generates a first model based on a preset model generation scheme.

The performance evaluator 280 estimates 815 the performance of the model generated by the model generator 210. For example, the performance evaluator estimates the naïve FLOPS, naïve memory allocation, and naïve memory bandwidth. If the estimated performance on any of these 3 metrics is lower than a specified performance, the process advances to step 860, where a new model is generated by the model generator 210 based on the performance of the previous model. If the estimated performance is lower than a specified performance, the process advances to step 860, where a new model is generated by the model generator 210 based on the performance of the previous model.

The model compiler 230 generates an intermediate representation of the model generated by the model generator. The intermediate representation of the model is agnostic to the platform the model will be used in. Moreover, model compiler 230 generates the intermediate representation of the model before the model has been trained. That is, the model compiler 230 generates the intermediate representation of the model based on default or randomized parameters. As such, the system is able to test multiple models without having to wait for the model to be trained, thus reducing the amount of computing power and time used to test and select a model for using in the target system.

The virtual machine 240 generates machine code from the intermediate representation of the model. In some embodiments, the virtual machine 240 generates machine code for the entire model. In other embodiments, the virtual machine 240 generates machine code for portions of the model.

Based on the generated machine code, the performance evaluator 280 measures 840 the performance of the model. In some embodiments, the performance evaluator 280 emulates the machine code for determining the expected performance of the model. In other embodiments, the performance evaluator 280 instructs a physical system to perform the instructions included in the machine code and evaluates the performance of the model as the instructions are executed. In other embodiments, the performance evaluator 280 directly determines an expected performance of the model based on the machine code and information known about the target platform, such as amount of memory available in the target platform and computing power of the embedded processor.

The performance evaluator 280 determines a latency in performing the machine code, a frame rate at which the machine code can be executed, an amount of power for executing the machine code, and an amount of resources used by executing the machine code. In some embodiments, the performance evaluator 280 determines if the machine code can be performed within a specified performance (e.g., with a 10 ms latency and a 60 frames per second frame rate). In other embodiments, the performance evaluator 280 determines a score for the model.

Based on the performance of the model as determined by the performance evaluator 280, the model generator 210 generates a new model and steps 820 through 840 are repeated. The model generator 210 may further generate the new model based on the intermediate representation of the previous model. For example, if the performance evaluator 280 determines that the model cannot be performed at a frame rate of 60 FPS, the model generator 210 generates a new model that includes fewer layers in the neural network. In some embodiments, the system generates new models until a model that meets a desired performance is generated. In other embodiments, the system generates a set number of model and selects a subset of models with the highest performance for further testing. In one embodiments, heuristics are used to select a subset of models that perform within the desired performance.

If the model performs with a least a desired performance, the model is trained 850. In some embodiments, the model is further evaluated 855 after the model has been trained. After training the model, an intermediate representation of the trained model is generated, and the trained model is tested. The system may select and train multiple models that perform within the desired performance characteristics. The selected models are tested and one of the tested models is selected for deployment to the target platform. In some embodiments, the selected models are evaluated 855 for accuracy and the most accurate model is selected for deployment to the target platform. In some embodiments, if the accuracy of the model is lower than a specified performance, the process advances to step 860 where a new model is generated by the model generator 210 based on the performance/accuracy of the previous model.

Deployment System Architecture of Machine-Learned Model

Figure 9:
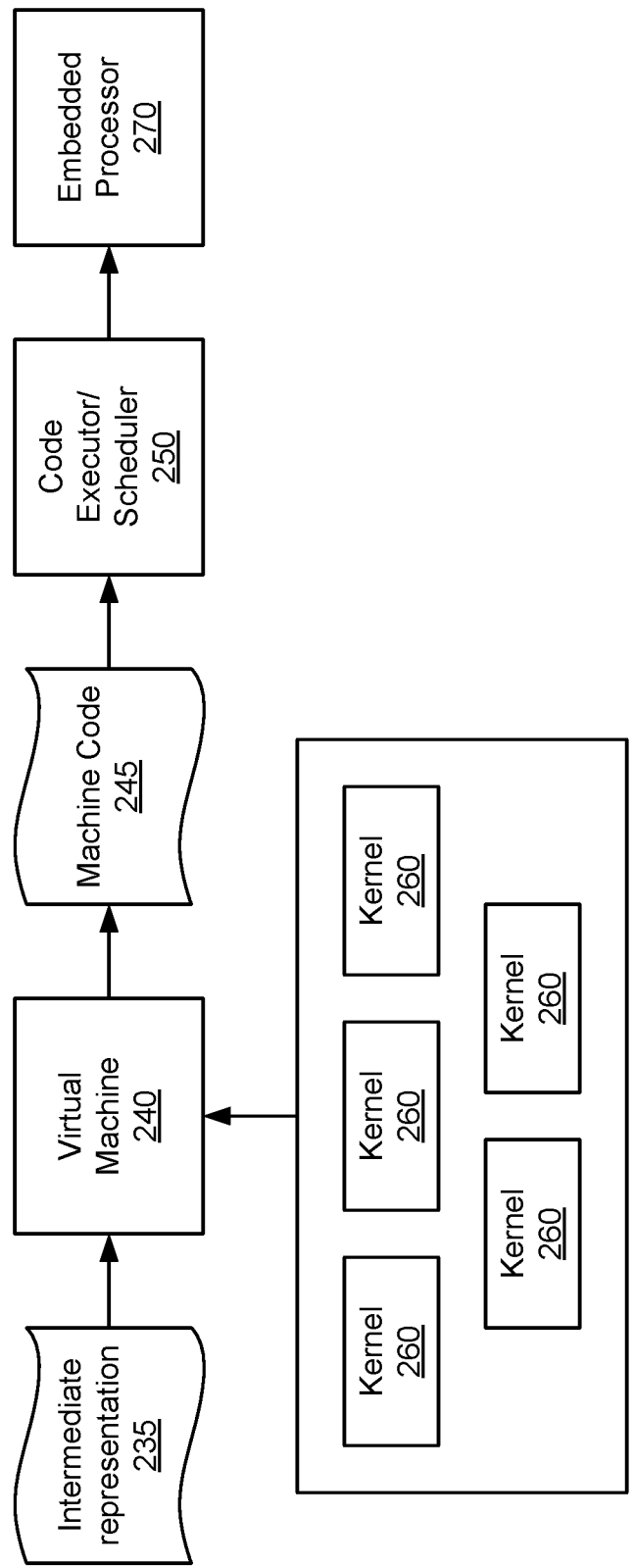
FIG. 9 illustrates a deployment system architecture of the machine-learned model in the autonomous control system, in accordance with an embodiment.

FIG. 9 illustrates a deployment system architecture of the machine-learned model in the autonomous control system, in accordance with an embodiment.

The deployment system stores the intermediate representation of the trained model generated by the model generation system 140. The intermediate representation is stored in the storage module 180 (e.g., a hard disk drive or a solid state drive) of the autonomous control system. The storage module 180 further stores code for performing the functions of the virtual machine.

The virtual machine 240 generates machine code 245 from the intermediate representation 235 stored in the storage model 180. The virtual machine 240 generates the machine code 245 using the kernels stored in the storage model 180. The code executor 250 receives the machine code 245 generated by the virtual machine and instructs the embedded processor to execute the set of instruction listed in the machine code 245. The processor, such as CPU 150 or GPU 160 of the autonomous control system, executes the generated machine code for applying the model on data captured by sensors 190. For example, the GPU 160 performs the generated machine code using images captured by an imaging sensor of the autonomous control system.

CONCLUSION

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A method for generating a machine-learned model comprising:
   generating an untrained model;
   generating an intermediate representation of the untrained model, the intermediate representation in an intermediate language compatible with a virtual machine;
   evaluating the performance of the untrained model, wherein evaluating the performance includes at least one of determining a latency in applying the untrained model in a target system, determining a frequency at which the untrained model can be applied in the target system, determining an amount of resources used by the untrained model, and determining an amount of power consumed by the target system using the untrained model;

iteratively generating and evaluating new untrained models, a new untrained model generated based on a performance of a previous model;

selecting a subset of models based on a performance of the generated new untrained models;

training the selected subset of models, thereby generating trained models;

evaluating an accuracy for each of the trained models; and selecting a trained model based on the performance evaluation of the trained models for deployment to the target system.

2. The method of claim 1, wherein determining an amount of resources used by the untrained model comprises:

determining a number of floating point operations used by the untrained model when implemented with default kernels.

3. The method of claim 1, wherein determining an amount of resources used by the untrained model comprises:

determining a number of floating point operations used by the untrained model when implemented with optimized kernels.

4. The method of claim 1, wherein determining an amount of resources used by the untrained model comprises:

determining a total amount of memory used by the untrained model; and determining a total memory bandwidth used by the untrained model.

5. The method of claim 1, wherein determining an amount of resources used by the untrained model comprises:

determining an amount of memory used by the untrained model after parameters and variables used by the untrained model have been scheduled; and determining a memory bandwidth used by the untrained model after the parameters and variables used by the untrained model have been scheduled and after operations of the untrained model have been scheduled.

6. The method of claim 1, further comprising generating an intermediate representation of the trained models.

7. The method of claim 1, wherein selecting the subset of models comprises electing a first subset of models that perform with at least a specified performance.

8. The method of claim 4, further comprising reducing a number of untrained models based on heuristics to identify the models to be trained.

* * * * *